United States Patent
Shabtay et al.

(10) Patent No.: US 7,345,991 B1
(45) Date of Patent: Mar. 18, 2008

(54) CONNECTION PROTECTION MECHANISM FOR DUAL HOMED ACCESS, AGGREGATION AND CUSTOMER EDGE DEVICES

(75) Inventors: Lior Shabtay, Ganai Tikva (IL); Yaron Raz, Emek Sorek (IL)

(73) Assignee: Atrica Israel Ltd., Herzelia (IL)

( * ) Notice: Subject to any disclaimer, the term of this patent is extended or adjusted under 35 U.S.C. 154(b) by 1036 days.

(21) Appl. No.: 10/447,835

(22) Filed: May 28, 2003

(51) Int. Cl.
*H04L 12/56* (2006.01)

(52) U.S. Cl. .................. 370/221; 370/225; 709/239

(58) Field of Classification Search .......... 370/221, 370/225
See application file for complete search history.

(56) References Cited

U.S. PATENT DOCUMENTS

| | | | |
|---|---|---|---|
| 6,865,160 B1* | 3/2005 | Bare ..................... | 370/256 |
| 6,904,018 B2* | 6/2005 | Lee et al. ............... | 370/238 |
| 2003/0189898 A1* | 10/2003 | Frick et al. ............ | 370/227 |
| 2005/0180339 A1* | 8/2005 | Guess et al. ........... | 370/257 |

OTHER PUBLICATIONS

U.S. Appl. No. 10/190,236, filed Jul. 5, 2002, Shabtay et al.
U.S. Appl. No. 10/201,852, filed Jul. 23, 2002, Shabtay et al.
Borden et al., "A Framework for Metro Ethernet Protection", Metro Ethernet Forum Technical Committee, Oct. 2002.
Borden et al., "An Implementation-agreement for Metro Ethernet Protection Using MPLS Mechanisms", Metro Ethernet Forum Technical Committee, Apr. 2002.
Pan et al., "Fast Reroute Extensions to RSVP-TE for LSP Tunnels", draft-ietf-mpls-rsvp-lsp-fastreroute-00.txt, Aug. 2003.

* cited by examiner

*Primary Examiner*—Hassan Kizou
*Assistant Examiner*—Jeffrey M Rutkowski
(74) *Attorney, Agent, or Firm*—Zaretsky Patent Group PC; Howard Zaretsky

(57) ABSTRACT

A protection mechanism capable of providing both local and end-to-end connection protection for dual homed access/aggregation devices or customer-edge devices in a network. The protection mechanism provides end-to-end and fast local protection for off the shelf access devices that do not have any built in per-connection protection capabilities. The access device is connected via two separate physical uplinks to two edge switches of the network. For each connection to be protected, a main path is provisioned from one edge switch and an alternative path is provisioned from the other edge switch. The edge switches are adapted to comprise means for switching traffic from the main path to the alternative path in the event a failure along the main path is detected. Failures both in the stack portion, the core portion and in the access device uplinks are protected against.

91 Claims, 15 Drawing Sheets

CONNECTION PROTECTION MECHANISM FOR DUAL HOMED ACCESS, AGGREGATION AND CUSTOMER EDGE DEVICES

REFERENCE TO RELATED APPLICATIONS

This application is related to U.S. application Ser. No. 10/190,236, filed Jul. 5, 2002, entitled "End-to-End Notification of Local Protection Using OAM Protocol," now U.S. Pat. No. 7,197,008 and to U.S. application Ser. No. 10/201,852, filed Jul. 23, 2002, entitled "Fast Connection Protection In A Virtual Local Area Network Based Stack Environment", now U.S. Pat. No. 7,093,027, both similarly assigned and incorporated herein by reference in their entirety.

FIELD OF THE INVENTION

The present invention relates generally to data communications and more particularly relates to a mechanism for providing end-to-end and fast local connection protection for dual homed access, aggregation and client-edge devices.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network.

Multiprotocol Label Switching (MPLS)

Multiprotocol Label Switching (MPLS) based networks are becoming increasingly popular especially in traffic engineering IP networks. MPLS uses a label switching model to switch data over a Label Switched Path (LSP). The route of an LSP is determined by the network layer routing function or by a centralized entity (e.g., a Network Management System) from the topology of the network, the status of its resources and the demands of the user. Any suitable link state routing protocol may be used such as Open Shortest Path First (OSPF) or Intermediate System to Intermediate System (ISIS) routing protocol to provide the link state topology information needed by the network layer routing to engineer data traffic. Another possibility is to utilize a local neighbor-discovery protocol whereby the global topology is maintained by a centralized management entity. LSPs may be setup using any suitable signaling protocol such as RSVP-TE, CR-LDP or using the management plane (e.g., the NMS setting the relevant MIB items that create the LSPs).

There is increasing demand by users that networks include a mechanism for fast repair of the services delivered by the network upon failure of network resources such as links or nodes. Since a LSP traverses a fixed path in the network, its reliability is dependent on the links and nodes along the path. It is common for many networks to provide some form of protection in the event of failure. For example, in the event of a link or node failure, the network can be adapted to switch data traffic around the failed element via a protection route.

The protection of traffic can be accomplished in several ways using the MPLS framework. Two ways that traffic can be protected using MPLS include recovery via LSP rerouting or via MPLS protection switching or rerouting actions.

The two basic models for path recovery include path rerouting and protection switching. Protection switching and rerouting may be used in combination. For example, protection switching provides a quick switchover to a recovery path for rapid restoration of connectivity while slower path rerouting determines a new optimal network configuration at a later time.

In recovery by path rerouting, new paths or path segments are established on demand for restoring traffic after the occurrence of a fault. The new paths may be chosen based upon fault information, network routing policies, pre-defined configurations and network topology information. Thus, upon detecting a fault, paths or path segments to bypass the fault are established using the signaling protocol or the NMS. Note that reroute mechanisms are inherently slower than protection switching mechanisms, since more processing and configuring must be done following the detection of a fault. The advantage of reroute mechanisms is that they are cheaper since no resources are committed until after the fault occurs and the location of the fault is detected. An additional advantage of reroute mechanisms is that the LSP paths they create are better optimized, and therefore consume less network resources.

Note also that once the network routing algorithms have converged after a fault, it may be preferable to re-optimize the network by performing a reroute based on the current state of the network and network policies in place.

In contrast to path rerouting, protection switching recovery mechanisms pre-establish a recovery path or path segment, based on network routing policies and the restoration requirements of the traffic on the working path. Preferably, the recovery path is link and node disjoint with the working path. When a fault is detected, the protected traffic is switched over to the recovery path(s) and restored.

The resources (i.e. bandwidth, buffers, processing, etc.) on the recovery path may be used to carry either a copy of the working path traffic or extra traffic that is displaced when a protection switch occurs leading to two subtypes of protection switching. In the first, known as 1+1 protection, the resources (bandwidth, buffers, processing capacity) on the recovery path are fully reserved, and carry the same traffic as the working path. Selection between the traffic on the working and recovery paths is made at the path merge LSR (PML).

In the second, known as 1:1 protection, the resources (if any) allocated on the recovery path are fully available to low priority or excess information rate (EIR) traffic except when the recovery path is in use due to a fault on the working path. In other words, in 1:1 protection, the protected traffic normally travels only on the working path, and is switched to the recovery path only when the working path has a fault. Once the protection switch is initiated, the low priority or EIR traffic being carried on the recovery path is displaced by the protected traffic. This method affords a way to make efficient use of the recovery path resources.

An example of protection switching in MPLS networks is described below. Consider an example MPLS based network incorporating a bypass tunnel. The network comprises a plurality of label switched routers (LSRs) connected by links. Backup (i.e. bypass) tunnels are established for protecting LSPs statically by the management station or using RSVP signaling. RSVP extensions for setting up protection (bypass) tunnels have been defined. To meet the needs of real-time applications such as video on demand, voice over IP, Circuit Emulation Service (CES), etc., it is desirable to affect the repair of LSPs within tens of milliseconds. Protection switching can provide such repair times.

The LSPs can also be protected (i.e. backed up) using the label stacking capabilities of MPLS. Instead of creating a separate LSP for every backed-up LSP, a single LSP is created which serves to backup a set of LSPs. Such a LSP is termed a bypass tunnel. The bypass tunnel itself is established just like any other LSP-based tunnel. The bypass tunnel must intersect the original LSP(s) somewhere downstream of the point of local repair. Note that this implies that the set of LSPs being backed up all pass through a common downstream node. Candidates for this set of tunnels include all LSPs that pass through the point of local repair, through the facility being bypassed and through to the point at which the bypass tunnel terminates.

To repair the backed up tunnels, packets belonging to a failed tunnel are redirected onto the bypass tunnel. An additional label representing the bypass tunnel is stacked onto the redirected packets. At the last LSR of the bypass tunnel, the label for the bypass tunnel is popped off the stack, revealing the label that represents the tunnel being backed up. An alternative approach is to pop the bypass-tunnel label at the penultimate LSR of the bypass tunnel.

Virtual Local Area Networks (VLANs)

Local Area Networks (LANs) were originally defined as a network of computers located within the same area. Today, Local Area Networks are defined as a single broadcast domain whereby broadcasts from a user will be received by every other user on the LAN. Use of a router can prevent broadcast messages from leaving a LAN. The disadvantage of this method is that routers usually take more time to process incoming data compared to a bridge or a switch in addition to the fact that routers are more complicated to configure. More importantly, the formation of broadcast domains depends on the physical connection of the devices in the network. Virtual Local Area Networks (VLANs) were developed as an alternative solution to using routers to contain broadcast traffic.

A LAN can be logically segmented into different broadcast domains. Since it is a logical segmentation and not a physical one, workstations do not have to be physically located together in order to be in the same broadcast domain. Users on different floors of the same building, or even in different buildings can now belong to the same LAN. VLANs also allow broadcast domains to be defined without using routers. Bridging software is used instead to define which workstations are to be included in the broadcast domain. Routers would only have to be used to communicate between two VLANs.

The behavior of VLANs are defined by the IEEE 802.1Q specification which defines VLAN as a network of devices configured through software rather than hardware that behave as if they are connected to the same wire even though they may actually be physically located on different segments of a LAN. In a VLAN, when a computer is physically moved to another location, it can stay on the same VLAN without any hardware physical reconfiguration (e.g., relocation of hardware) and without needing to change its IP address.

The advantages of VLANs include (1) increased performance since broadcast messages are not needlessly sent to every destination, (2) the ability to form virtual workgroups, (3) simplified administration since recabling, station addressing and reconfiguration of hubs is not necessary for adds, moves and changes, (4) reduced cost since a lower number of expensive routers is required, and (5) improved security by controlling broadcast domains and reducing chances of an outsider gaining access to data.

VLANs work by assigning a tag to the packet that uniquely identifies the packet as belonging to a particular VLAN. When a bridge receives data from a workstation, it tags the data with a VLAN identifier indicating the VLAN from which the data came. This is called explicit tagging. It is also possible to determine to which VLAN the data received belongs using implicit tagging. VLAN tags can be assigned based on several criteria such as the port from which it came, the source MAC address of the received packet or the protocol type of the received packet. The bridge maintains a mapping between VLAN IDs and the entity used for tagging such as port, MAC address, etc. For example, if tagging is by port, the database (called a filtering database) indicates which port belongs to which VLAN. This database is called a filtering database. When a packet is received on a port, the bridge makes a forwarding decision and adds the VLAN ID tag to the packet. A packet is sent out of a port only if that port is configured to forward the VLAN to which the packet belongs.

Connection Protection

It is becoming increasingly more common today to build networks from two or more subnetworks. As an example, consider a network that is built from two main parts: (1) a core network or transport portion, and (2) an edge network or access portion. Such networks are typically used by telecommunication carriers, for example, to provide one type of network to users for access purposes and to use a different type of network for transport of user data. In one common network configuration, the access or network edge portion is 802.1Q VLAN based and comprises edge switches that are adapted to handle VLAN tagged packets. Connections in the edge portion are provisioned using static VLAN configurations. The core portion comprises core switches that implement standard MPLS.

Protection, especially fast protection in the sub 50 millisecond range, in the core MPLS based network can be provided in several ways as outlined by the IETF, by the ITU and by the MEF. For example, see Borden et al., "A Framework for Metro Ethernet Protection," MEF Technical Committee, October 2002; Borden et al., "An implementation-agreement for Metro Ethernet Protection using MPLS Mechanism," MEF Technical Committee, April 2002; and Ping Pan et al., "Fast Reroute Extensions to RSVP-TE for LSP Tunnels", draft-ietf-mpls-rsvp-lsp-fastreroute-02.txt, Internet Engineering Task Force, MPLS Working Group, August 2003, all of which are incorporated herein by reference in their entirety.

As described above, two types of protection include end-to-end protection and local protection. The former provides an alternative backup path in the event a failure occurs along the primary path. The latter provides protection at the core wherein each link (or possibly also each node, or each other resource, in accordance with the protection-tunnels deployed) is protected by a backup protection tunnel. In the event of a link failure, MPLS provides local protection to quickly restore traffic through the bypass protection tunnel.

With the proliferation of the use of multicast connections in networks, a mechanism of providing fast protection is desirable. Multicast distribution of data in MPLS networks is typically achieved using point to multipoint LSPs to create multicast distribution trees. The protection of these multicast distribution trees is gaining in importance as the number of clients grows and the volume of data distributed via these trees increases.

Connection Protection for Access, Aggregation and Customer Edge Devices

In many networks, access devices (also referred to as aggregation devices) are used to aggregate users and/or ports in order to reduce equipment and other related costs. An access device is typically a provider owned layer-2 device that may serve one or more clients and functions to aggregate multiple users or user-access ports to a single port. For example, 24 users may be connected to the network via a single port. Regardless of the number of users aggregated, the number of individual connections, VLANs, etc. remains the same.

To increase the reliability of the network, it is desirable to connect an access device, which is typically a low cost off the shelf device, in a dual homing arrangement to two different edge switches via two separate uplinks so as to provide redundancy. These two uplinks are symmetric, whereby each serves as the preferred uplink for a portion of the connections. If an uplink fails, connectivity to customers and users is still retained by use of the other uplink. Further, if one of the edge switches fails, users can connect through the other edge switch. In networks that provide protection for connections from edge to edge, it is desirable to extend protection to the access devices as well. A problem arises since typical access devices do not have any capability on their own of participating in such protection schemes.

There is therefore a need for a protection mechanism that is capable of providing end-to-end protection as well as local (i.e. fast) protection for connections that start at dual homed access devices that do not have any notion of end-to-end connection decision making or per connection Operations Administration and Maintenance (OA&M or simply OAM).

A customer edge (CE) device is a device that connects a single customer to the service provider network. The CE is usually part of the customer network but may be owned by either the customer or the service provider. A customer edge device may also be connected to the provider network in dual homing so that the connectivity of the customer to the provider network is better protected. As with access devices, it is desirable to provide a mechanism for protecting connections that begin at dual homed customer edge devices.

SUMMARY OF THE INVENTION

The present invention provides a protection mechanism capable of providing connection protection for dual homed access, aggregation and client-edge devices in a network. The mechanism of the present invention is especially suitable for use in networks comprising a VLAN stack or VLAN switching based access edge portion and a Multi-Protocol Label Switching (MPLS) based core portion. The mechanism can be extended to support other topologies and protocols as well. The invention is applicable to many types of networks, Metro Ethernet Networks (MENs) in particular.

It is noted that although the description of the invention refers to access devices (AD), the invention is also applicable for client edge (CE) devices and aggregation devices as well.

The protection mechanism of the present invention is operative to provide end-to-end and fast local protection for off the shelf access devices that do not have any per connection dual-homing protection capabilities built in. The access device is connected via two ports to two edge switches in the VLAN stack portion of the network via two separate physical uplinks. Connections are assigned to VLANs on the access device. Traffic of a specific connection normally flows over one of the uplinks absent a failure. The preferred uplink may be different for different connections, thus providing traffic load-balancing between the uplinks. In the event of a failure, the traffic is switched to the other uplink. This behavior can be achieved in the AD, for example, by setting a Link Aggregation Group (LAG) between the two uplinks, with a specific LAG function that sends all packets of a single VLAN to one of the uplinks as long as both are operational.

Separate uplinks between the access device and the two edge switches provides redundancy, increases reliability and provides protection in the event one of the uplinks fails. Off the shelf conventional access devices do not have protection capabilities. These devices have no capability for per connection end-to-end or local protection. Typically, off-the-shelf devices support only LAG and/or Spanning Tree Protocol (STP) provided for protection and resiliency purposes. LAG provides local uplink-protection provided that the device is not dual-homed, i.e. is connected to a single neighboring device. STP does not have a per connection notion, and creates a single spanning-tree for all connections, which means that the network cannot be traffic engineered. Per-VLAN MSTP can be used as a per-connection resiliency mechanism, but most off-the-shelf devices do not support it. The protection mechanism of the present invention provides such protection capabilities by extending protection to dual homed access devices connected to edge switches in a VLAN stack.

For each connection to be protected a main path is provisioned from one edge switch and an alternative path is provisioned from the other edge switch. The edge switches are adapted to comprise means for switching traffic from the main path to the alternative path in the event a failure along the main path is detected. Failures both in the stack portion, the core portion and in the access device uplinks are protected against.

The edge switches are adapted to comprise means for monitoring and detecting the failure of an edge port connecting the edge switch to a core switch. In case of a failure of such a port, rather than drop packets destined for the access device, the protection mechanism of the present invention tags the packets with the alternative VLAN and returns the packet back out the network port it was received on. The packet arrives at the core switch that originally sent it. The core switch then places the packet on a protection tunnel, which brings it to the other side of the VLAN stack. The packets exit the tunnel and are forwarded along the alternative path in the VLAN stack to the edge-switch port that is connected to the other uplink of the same access device. The access device receives the packet and can now send it to the user.

It is important to also note that the invention is not limited by the type of network in use, the PHY layer, the type of protection paths used or by the type of signaling in use or by whether provisioning is based on signaling or performed in the management plane. Examples of applicable networks include, but are not limited to, Ethernet, MPLS and Private Network to Network Interface (PNNI) based Asynchronous Transfer Mode (ATM) networks.

Note that the invention is suitable for implementation in hardware such as a network processor (which may comprise a network-processor chip, an FPGA, an ASIC, etc.), adapted to implement the protection mechanism of the present invention, software or a combination of hardware and software. In one embodiment, a network device (such as a core switch or edge switch) comprising a processor, memory, etc. is operative to execute software adapted to perform the dual homes access device protection mechanism of the present invention.

There is thus provided in accordance with the invention, a method of providing end-to-end protection for a dual homed device, the method comprising the steps of provisioning a main path starting at a first network device connected to the dual homed device via a first uplink, provisioning an alternative path starting at a second network device connected to the dual homed device via a second uplink, provisioning a Virtual Local Area Network (VLAN) for a connection at the dual homed device, sending and receiving Operation, Administration & Maintenance (OAM) packets periodically over the main path by the first network device to check the connectivity to a remote end of the connection over the main path and informing the remote end of failures in the main path, providing a first entry point to the alternative path in the event of a failure in the network wherein ingress packets received by the first network device on the first uplink are forwarded over the alternative path and providing a second entry point to the alternative path in the event of a failure in the first uplink wherein ingress packets received by the second network device on the second uplink are forwarded over the alternative path.

There is also provided in accordance with the invention, a system for providing end-to-end protection for dual homed devices in a network comprising means for provisioning a main path starting at a first network device connected to the dual homed device via a first uplink, means for provisioning an alternative path starting at a second network device connected to the dual homed device via a second uplink, means for provisioning a Virtual Local Area Network (VLAN) for a connection at the dual homed device, means for sending and receiving Operation, Administration & Maintenance (OAM) packets periodically over the main path by the first network device to check the connectivity to a remote end of the connection over the main path and informing the remote end of failures in the main path, means for providing a first entry point to the alternative path in the event of a failure in the network wherein ingress packets received by the first network device on the first uplink are forwarded over the alternative path and means for providing a second entry point to the alternative path in the event of a failure in the first uplink wherein ingress packets received by the second network device on the second uplink are forwarded over the alternative path.

There is further provided in accordance with the invention, a network device for providing end-to-end connection protection for dual homed devices in a network having a main path and an alternative path for a specific connection comprising a plurality of network ports for interfacing the network device to one or more network links, a plurality of edge ports for interfacing the network device to one or more dual homed devices, each dual homed device connected to two network devices via two uplinks, functioning as a main uplink and an alternative uplink with respect to the specific connection, a network processor, software means adapted to be executed by the network processor and operative to: provision a main path starting at a first network device connected to the dual homed device via the main uplink, provision an alternative path starting at a second network device connected to the dual homed device via the alternative uplink, provision a Virtual Local Area Network (VLAN) for a connection at the dual homed device, send and receive Operation, Administration & Maintenance (OAM) packets periodically over the main path by the first network device to check the connectivity to a remote end of the connection over the main path and inform the remote end of failures in the main path, provide a first entry point to the alternative path in the event of a failure in the network wherein ingress packets received by the first network device on the main uplink are forwarded over the alternative path and provide a second entry point to the alternative path in the event of a failure in the first uplink wherein ingress packets received by the second network device on the alternative uplink are forwarded over the alternative path.

There is also provided in accordance with the invention, a system for providing dual homed device protection in a network comprising at least one dual homed device connected to a first network device via a first uplink and to a network device switch via a second uplink, means for provisioning a main path starting at the first network device connected and for provisioning an alternative path starting at the second network device, means for returning egress packets in the event of a failure along the main path tagged with a tag for forwarding over a protection path to arrive at the dual homed device via the second uplink, means for returning ingress packets in the event of a failure along the main path tagged with the tag for forwarding over the alternative path towards a destination, means for returning egress packets back at the first network device switch in the event of a failure in the first uplink tagged with the tag for forwarding over a protection path to arrive at the dual homed device via the second uplink and means for sending ingress packets over the second uplink in the event of a failure in the main uplink to the second network device for tagging with the tag for forwarding over the alternative path towards the destination.

There is further provided in accordance with the invention, a method of providing connection protection for dual homed devices in a network device in a Virtual Local Area Network (VLAN) based stack having a main path and an alternative path, each network device including a plurality of edge ports and a plurality of network ports, the method comprising the steps of maintaining status of each network port and network link connected to the network device, maintaining status of each edge port and uplink to a dual-homed device connected to the network device, provisioning uplink edge ports as main or alternative with respect to a particular connection in accordance with the preference of the dual homed device for sending ingress packets of the particular connection, detecting a failure of a main edge port or main uplink of a connection, tagging ingress packets received from the dual homed device over an alternative uplink with an alternative VLAN for forwarding over the alternative path, tagging egress packets received over a network port with the alternative VLAN and returning the egress packets over the network port they were received on and forwarding packets received along the main path over a network port tagged with the alternative VLAN along the alternative path without forwarding to the dual homed device via a edge port.

There is also provided in accordance with the invention, a packet processor apparatus for use in a network device for providing connection protection for dual homed devices in a network having a main path and an alternative path, each network device including a plurality of edge ports and a plurality of network ports comprising means for maintaining status of each network port and network link connected to the network device, means for maintaining status of each edge port and uplink to a dual homed device connected to the network device, provisioning uplink edge ports as main or alternative with respect to a particular connection in accordance with the preference of the dual homed device for sending ingress packets of the particular connection, means for detecting a failure of a main edge port or main uplink, means for tagging ingress packets received from the dual homed device over an alternative uplink with a tag for forwarding over the alternative path, means for sending egress packets received over a network port tagged with a tag for forwarding over a protection path leading into the alternative path and means for forwarding packets received along the main path over a network port tagged with a tag for sending over the alternative path along the alternative path without forwarding to the dual homed device via a edge port.

There is further provided in accordance with the invention, a network device for providing connection protection for dual homed devices in network having a main path and an alternative path for a specific connection comprising a plurality of network ports for interfacing the network device to one or more network links, a plurality of edge ports for interfacing the network device to one or more dual homed devices, each dual homed device connected to two network devices via two uplinks, functioning as a main uplink and an alternative uplink with respect to the specific connection, a network processor, software means adapted to be executed by the network processor and operative to: maintain status of each network port and network link connected to the network device, maintain status of each edge port and uplink connected to the network device, detect a failure of an edge port or main uplink, tag ingress packets received from the dual homed device over an alternative uplink with a first tag for forwarding over the alternative path, tag egress packets received over a network port destined to a dual homed device with a second tag for forwarding over a protection path leading to the alternative path and send the egress packets over the respective protection path and forward packets received along the main path over a network port tagged with a third tag for forwarding over the alternative path without forwarding to the dual homed device via an edge port.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
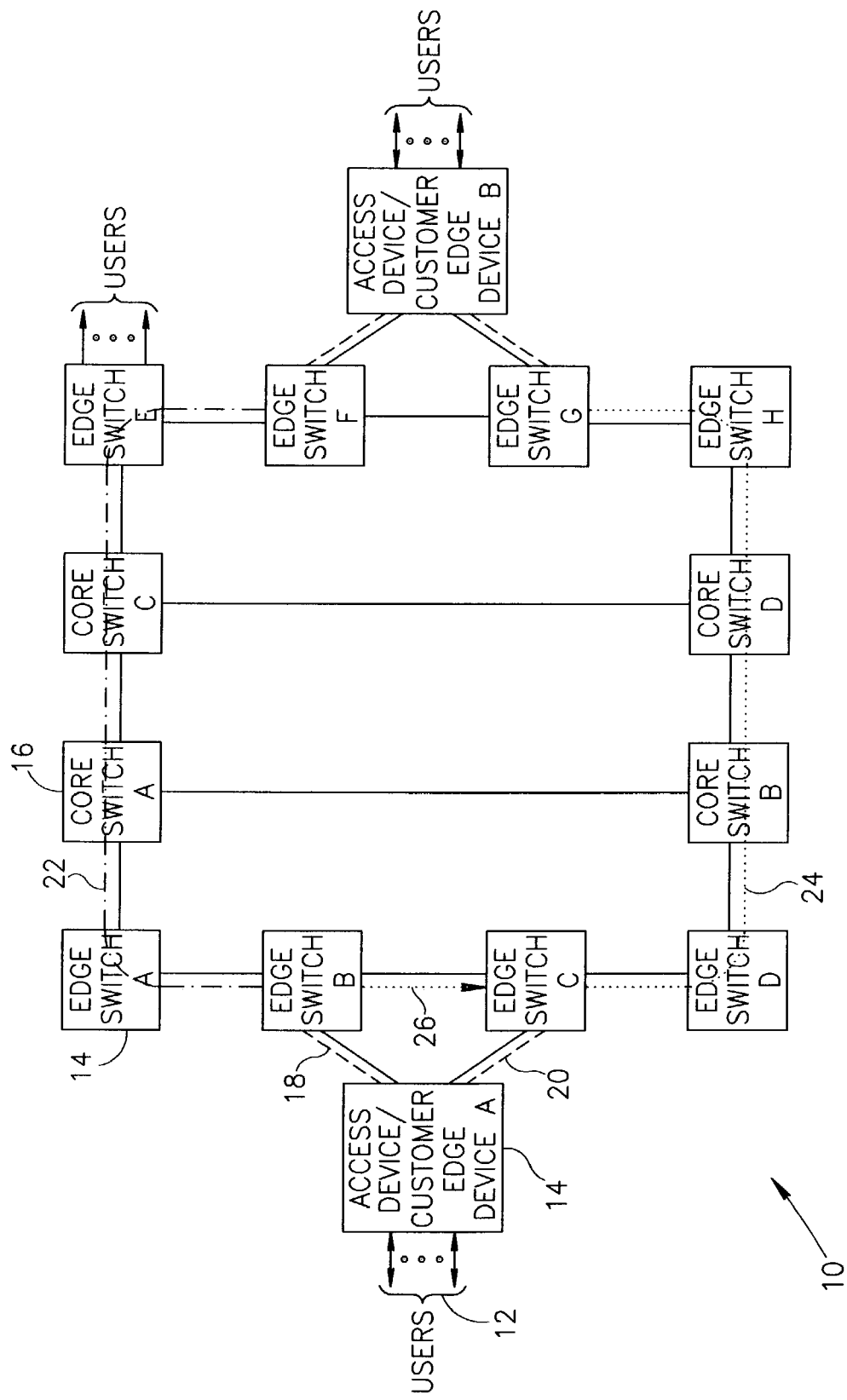
FIG. 1 is a diagram illustrating the topology of a typical example network incorporating dual homed access devices wherein the network is divided into a VLAN stack based portion and a core switch portion.

The following notation is used throughout this document.

| Term | Definition |
|---|---|
| AD | Access Device |
| ASIC | Application Specific Integrated Circuit |
| ATM | Asynchronous Transfer Mode |
| CD-ROM | Compact Disc-Read Only Memory |
| CE | Customer Equipment |
| CPU | Central Processing Unit |
| CR-LDP | Constraint-based Label Distribution Protocol |
| CS | Core Switch |
| CSIX | Common Switch Interface |
| DAT | Digital Audio Tape |
| DSP | Digital Signal Processor |
| DVD | Digital Versatile Disk |
| EEPROM | Electrically Erasable Programmable Read Only Memory |
| EIR | Excess Information Rate |
| EPROM | Erasable Programmable Read Only Memory |
| ES | Edge Switch |
| FDDI | Fiber Distributed Data Interface |
| FE | Fast Ethernet |
| FPGA | Field Programmable Gate Array |
| GE | Gigabit Ethernet |
| IETF | Internet Engineering Task Force |
| IP | Internet Protocol |
| ISIS | Intermediate System to Intermediate System |
| ITU | International Telecommunications Union |
| LACP | Link Aggregation Control Protocol |
| LAG | Link Aggregation Group |
| LAN | Local Area Network |
| LSB | Least Significant Bit |

-continued

| Term | Definition |
| --- | --- |
| LSP | Label Switched Path |
| LSR | Label Switching Router |
| MAC | Media Access Control |
| MEF | Metro Ethernet Forum |
| MEN | Metro Ethernet Network |
| MIB | Management Information Base |
| MPLS | Multi-Protocol Label Switching |
| MSTP | Multiple Spanning Tree Protocol |
| NIC | Network Interface Card |
| NMS | Network Management System |
| OAM | Operations Administration and Maintenance |
| OPD | Other Path Down |
| OSPF | Open Shortest Path First |
| PC | Personal Computer |
| PDH | Plesiochronous Digital Hierarchy |
| PML | Path Merge LSR |
| PNNI | Private Network to Network Interface |
| PPE | Packet Processing Engine |
| PSL | Path Switch LSR |
| RAM | Random Access Memory |
| ROM | Read Only Memory |
| RPR | Resilient Packet Ring |
| RSVP | Reservation Protocol |
| RSVP-TE | Reservation Protocol with Traffic Engineering Extensions |
| SDH | Synchronous Digital Hierarchy |
| SONET | Synchronous Optical Network |
| STP | Spanning Tree Protocol |
| TDM | Time Division Multiplexing |

Definitions Used Throughout

The following terms and definitions apply throughout this document.

An access device (AD), also referred to as an aggregation device, is defined as any device that serves one or more users, functions to aggregate multiple users or user-access ports and comprises one or more uplink ports for connection to edge switches. Access devices are typically provider owned devices.

A customer edge (CE) device is defined as a device, which connects a single customer (i.e. user) to a provider network via one or more uplink ports. The dual homing connection protection mechanism of the present invention can be used with either access devices or customer edge devices. Although the description of the invention refers to access devices, it is appreciated that it applies to customer edge devices as well in exactly the same manner.

A VLAN stack is defined as a plurality of edge switches connected to each other in linear fashion with the ends of the stack connected to the same or two different core switches. A VLAN stack is made up of a plurality of edge switches each of which comprises a plurality of user ports and network ports. Each switch within the stack is connected to the switch above and below it through the network ports. The switches on the two ends of the stack are connected to neighboring edge switches through one network port and to core switches through another network port. A VLAN stack may be referred to simply as a stack and may also be referred to as an access ring.

A protection tunnel is defined as a bypass tunnel whereby different LSPs are able to share the same tunnel in order to bypass a failed facility. Protection tunnels may be created using any suitable mechanism such as using standing MPLS protocols.

As used in this document the term ingress packets is defined as those packets that flow from the dual-homed device to the remote side of a connection. The term egress packets are defined as those packets that flow from the remote side of a connection to the dual-homed device.

A point to multipoint LSP is defined as an LSP that enters each of the nodes in its path through a single port, but exits one or more of these nodes through multiple ports.

Rerouting is defined as a procedure for changing the route of a traffic path. Rerouting can serve as a recovery mechanism in which the broken path, the recovery path or segments of these paths are created dynamically after the detection of a fault on the working path or the protection path. Rerouting can serve as a recovery mechanism in which the recovery path is not pre-established. Rerouting can also serve as an optimization mechanism in which path routes are dynamically changed to ones that are better suited for current network conditions.

Protection switching is defined as a recovery mechanism in which the recovery path is created prior to the detection of a fault on the working path, path segment or network segment it protects. In other words, a recovery mechanism in which the recovery path is pre-established. Protection bandwidth is defined as bandwidth on a link reserved for protection purposes, e.g., protection tunnels, bypass tunnels, recovery path, detour paths and protection paths.

The working path is the protected path that carries traffic before the occurrence of a fault. The working path exists, in MPLS networks for example, between a PSL and PML. The working path can be of different kinds; a hop-by-hop routed path, a trunk, a link, an LSP, part of an LSP, a group of LSP parts or part of a multipoint-to-point LSP. The term primary path is a synonym for a working path. The active path is the path that is currently active, which may comprise the working (i.e. primary) path or the recovery (i.e. alternative or protection) path.

The recovery path is the path by which traffic is restored after the occurrence of a fault. In other words, the path on which the traffic is directed by the recovery mechanism. The recovery path may be established by MPLS means. The terms backup path, alternative path and protection path are synonyms for a recovery path.

A switchover is the process of switching the traffic from the path that the traffic is flowing on onto one or more alternate path(s). This may involve moving traffic from a working path onto one or more recovery paths, or may involve moving traffic from a recovery path(s) on to a more optimal working path(s). A switchback is the process of returning the traffic from one or more recovery paths back to the working path(s).

MPLS protection domain refers to the set of LSRs over which a working path and its corresponding recovery path are routed. MPLS protection plan refers to the set of all LSP protection paths and the mapping from working to protection paths deployed in an MPLS protection domain at a given time.

The term MPLS-based recovery refers to the ability to quickly restore traffic lost due to a fault in an MPLS-network. The fault may be detected on the MPLS layer or in lower layers over which MPLS traffic is transported. The fastest MPLS recovery is typically achieved using protection switching. The MPLS LSR switchover time is comparable to the 50 ms switchover time of SONET.

DETAILED DESCRIPTION OF THE INVENTION

For illustration purposes, the principles of the present invention are described in the context of a network comprising a VLAN based access (or edge) portion and an MPLS based core portion. The VLAN based edge portion employs 802.1Q VLAN tagging and the MPLS core portion employs any suitable routing such as OSPF-TE and either signaling such as RSVP-TE signaling or management-plane based provisioning such as creation of PVCs using an NMS. An NMS is also required for proper provisioning of both the edge and core switches in the network. It is assumed that the NMS or other management entity has full access to all edge and core switches in the network.

It is intended that the protection mechanism of the present invention be implemented in the VLAN based edge switches and MPLS based core switches. It is not intended, however, that the invention be limited to the configurations and embodiments described herein. It is appreciated that one skilled in the networking, electrical and/or software arts may apply the principles of the present invention to numerous other types of networking devices and network configurations as well without departing from the spirit and scope of the invention.

A diagram illustrating the topology of a typical example network incorporating dual homed access devices wherein the network is divided into a VLAN stack based portion and a core switch portion is shown in FIG. 1. The example network, generally referenced 10, comprises a core portion comprising a plurality of core switches 16, labeled core switch A through D, VLAN stack portion comprising a plurality of edge switches 14, including a first or local stack including edge switches A through D and a second or remote stack including edge switches E through H, and access device/customer edge device 14. Access device A is connected to the local stack and access device B is connected to the remote stack. Each access device connects a plurality of users 12 to the network. Access device A is dual homed to edge switches B and C via two separate uplinks. Similarly, access device B is dual homed to edge switches F and G via two separate uplinks.

Connections can be established, in accordance with the invention, between users attached to device A and device B. It is important to note that the protection scheme of the present invention can also be used with connections that start on a dual homed device on one side and end in an edge switch port to which the user is directly attached on the other side. For example, consider a connection between a user connected to device A and a user connected directly to edge switch E. In this case, a main path is provisioned from edge B to edge switch E while the alternative path is provisioned between edge switch C and edge switch E.

Separate uplinks between the access device and the two edge switches provides redundancy, increases reliability and provides protection in the event one of the uplinks fails. Off the shelf conventional access devices, however, do not have per connection protection capabilities. These devices are not aware of and have no capability for per connection end-to-end or local protection. The protection mechanism of the present invention, however, provides such protection capabilities by extending protection to dual homed access devices connected to edge switches in a VLAN stack.

The dual-homed access device protection mechanism of the present invention is being implemented and embodied in the commercially available product A-2100 Optical Ethernet Edge Switch manufactured by Atrica Inc., Santa Clara, Calif.

Each edge switch within the stack is connected to the edge switch above and below it through the network ports. The edge switches on the two ends of the stack are connected to neighboring edge switches through a network port and to core switches through a different network port. The edge switches implement and embody the dual-homed access device protection mechanism of the present invention and may comprise the A-2100 Optical Ethernet Edge Switch manufactured by Atrica Inc., Santa Clara, Calif. The core switches may comprise, for example, A-8100 or A-8800 Optical Ethernet core switches manufactured by Atrica Inc., Santa Clara, Calif. The core switches are MPLS based switches that use MPLS technology at their core ports for connection to neighboring core switches and use VLAN technology at their network edge ports that are the ports to which the end edge switches in the stack are connected.

It is assumed that each connection flowing through an access device is tagged with a different VLAN. The VLAN may be tagged originally at the source for example or by the access device. It is further assumed that the access device has certain functionality. In particular, the access device must be able to receive traffic from each of the connections on both uplinks at all times. The uplinks are the communication links connecting the access device to the two edge switches it is dual homed to. In addition, the access device has a preferred uplink for each connection. The preferred uplink is an uplink over which packets received from users for a particular connection are sent by the access device.

The above described behavior is achieved using standard Link Aggregation Group (LAG) capability defined by the IEEE 802.1 group as described in the IEEE 802.3ad trunking standard. Normally, LAG is used to aggregate a number of links connected between the same two neighboring devices to be used as a single logical port. The communication traffic is load balanced between the ports. The invention assumes that LAG capability is enabled on the two uplink ports on the access device dual homed to two edge switches. Note that this is a non-standard use of the LAG protocol.

Note that the 802.3ad standard includes the LAG for the data path and the Link Aggregation Control Protocol (LACP) for the control path. The latter protocol is used to check for correct connectivity between two devices. The invention assumes that the LACP protocol is disabled in the access device and edge switches.

An access device should be able to perform the LAG operation wherein the LAG distribution function depends on the VLAN-ID only by defining the two uplink ports as a LAG. In this case, the VLAN-ID used by the connection at the access device determines the preferred uplink used between the access device and the edge switch. As long as both uplinks are operational, the LAG distribution function will select a specific uplink for each connection in accordance with its VLAN. At the same time, the access device is able to receive packets of the connection from both uplinks. In the event one of the uplinks fails, the other is used for all connections.

Alternatively, an access device that performs the LAG operation wherein the distribution function depends only on the user port from which the packet was received also implements the required behavior by defining the two uplink ports as a LAG. In this case, the preferred uplink is determined by the user port of the access device that is used for the connection (i.e. the user port through which the user is attached to the access device).

In both cases, the LAG function is used to distribute the connections (rather than packets) between the uplink ports. Basing the distribution function on VLAN-ID or received port functions to distribute the packets on a connection basis rather than a packet basis (as is the case with a distribution function utilizing source and destination MAC address, for example). All packets of the same connection will be handled the same. Note that knowledge of the distribution function can be used to predict the uplink port for a particular VLAN (or port). Thus, assigning the VLAN-ID (or port) a priori permits the association of a connection with a particular uplink port.

Note also that the access device may comprise any aggregation device or customer edge device such as a layer 2 switch or a router that has LAG capability with one of the required distribution functions described supra.

Provisioning

In accordance with the invention, a protected connection requires two paths (a main path and an alternative path) to be configured end to end between the two end points of the connection. If one side of the connection starts at an access device that is dual homed to two edge devices in a stack, each of the two paths is directed at that stack in opposite directions through the stack. The NMS in the network is adapted to configure the VLANs to be used by the connection along the stack as follows. Two VLAN paths including both main and alternative are configured for each connection wherein one path is provisioned towards the core switch on one end of the stack and the other path is provisioned towards the core switch at the other end of the stack. From these core switches the paths preferably continue as disjoined paths through the network until reaching the user at the other side of the connection. In the event of a link failure, protected traffic is switched to the alternative path.

Figure 2:
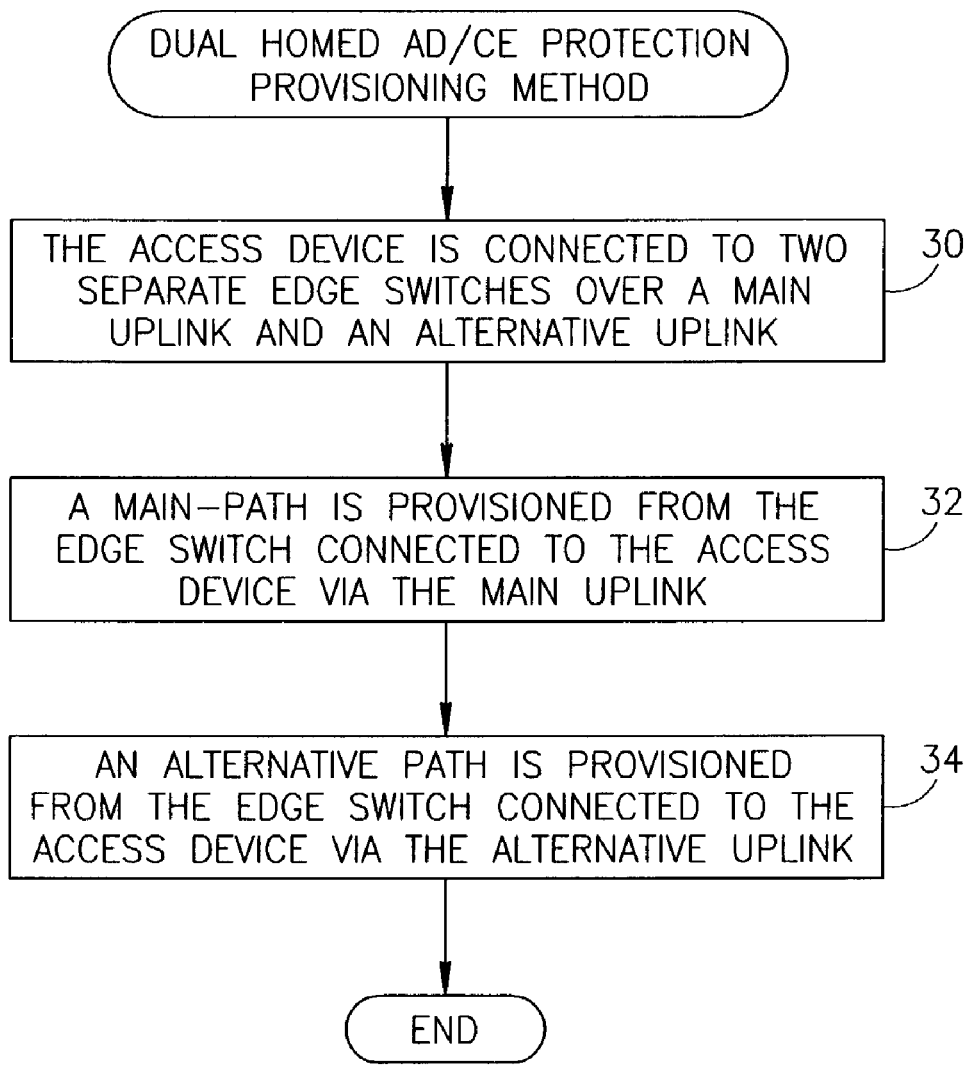
FIG. 2 is a flow diagram illustrating the method of provisioning for use in providing dual homed access device connection protection in accordance with the present invention.

A flow diagram illustrating the method of provisioning for use in providing dual homed access device connection protection in accordance with the present invention is shown in FIG. 2. With reference to FIGS. 1 and 2, in accordance with the present invention, the access device is connected to two separate edge switches over a main uplink with respect to a specific connection and an alternative uplink with respect to a specific connection (step 30). The main and alternative paths are provisioned starting from the two edge switches that are connected to the access device. The main path (dotted-dashed line 22) starts at one of the edge switches and the alternative path (dotted line 24) starts at the other edge switch. The uplink connected between the access device and the edge switch of the main path is referred to as the main-uplink and the uplink between the access device and the edge switch of the alternative path is referred to as the alternative-uplink. Note that throughout this document, dashed connected represent uplinks between the access device and edge switches, dashed-dotted lines represent the main path and dotted lines represent the alternative path.

With reference to FIG. 1, for example, the main path starts at edge switch B and the alternative path starts at edge switch C. The selection of the edge switch from which the main path starts is made according to the preferred uplink that the access device allocates for that particular connection. The main path starts at the edge switch that is connected to the preferred uplink (i.e. main uplink) of the access device where the connection starts (step 32). The alternative path starts at the edge switch connected to the access device via the alternative path (step 34). Preferably, the two paths are provisioned along the network so as to make them as disjoined as possible while both reach the other side of the connection.

Note that in actuality, the alternative path begins at edge switch B. In the event of a failure of the main path, edge switch B injects packets tagged with the alternative VLAN onto the alternative path. This is represented in the example network 10 by the dotted arrow 26.

The two dashed lines 18, 20 connecting the access device to edge switches B and C represent the same VLAN from the access device point of view. Both uplinks participate in the same single LAG and the same VLAN.

End-to-End Protection Protocol

An OA&M (e.g., Hello) protocol is used for verification of connectivity with the remote side a connection. On the local side, Hello protocol processing is performed by the two edge switches to which the access device is connected. The remote side also participates in the OA&M protocol for monitoring the two paths and in the end-to-end connection protection protocol which determines which of the two paths (either main or alternative) should be used at every given moment. The discovery of a path failure is performed by a Hello protocol that is executed by the edge switches at both ends of the path. The Hello protocol involves sending Hello packets along the path in both directions in order to monitor the health of the path. This requires that either a bidirectional path or two unidirectional paths going in reverse directions be used.

Note that end-to-end protection is important for several reasons. End-to-end protection provides complete coverage for failures in all portions of the network. Some connections in the network lack local protection thus leaving end-to-end protection as the only means of protection. Even for connections in the network which are covered by local protection, end-to-end protection is provided several seconds after local protection is activated in order to optimize the protection path.

Figure 3A:
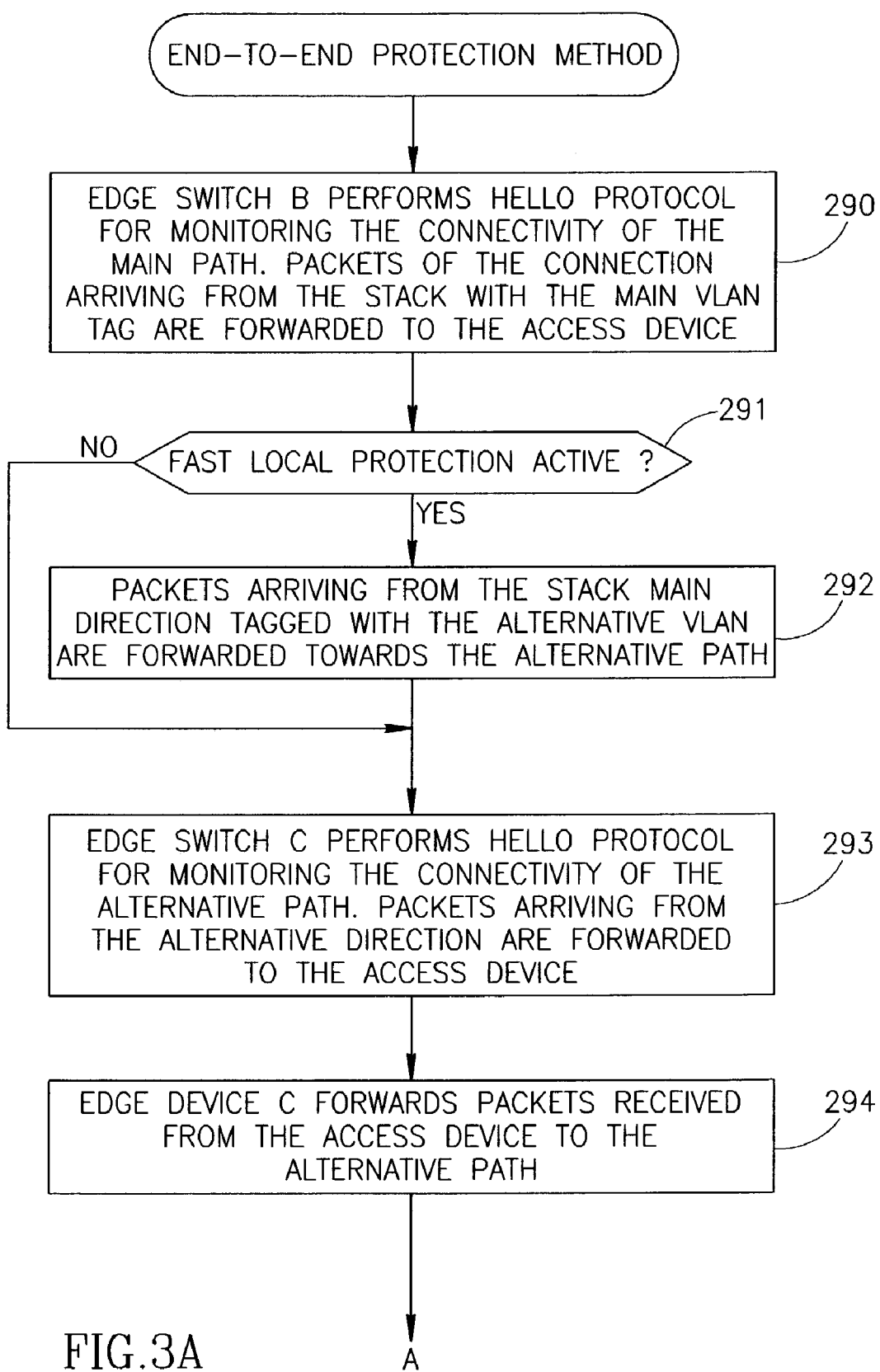
FIGS. 3A and 3B are a flow diagram illustrating the end-to-end OAM based protection method of the present invention.
Figure 3B:
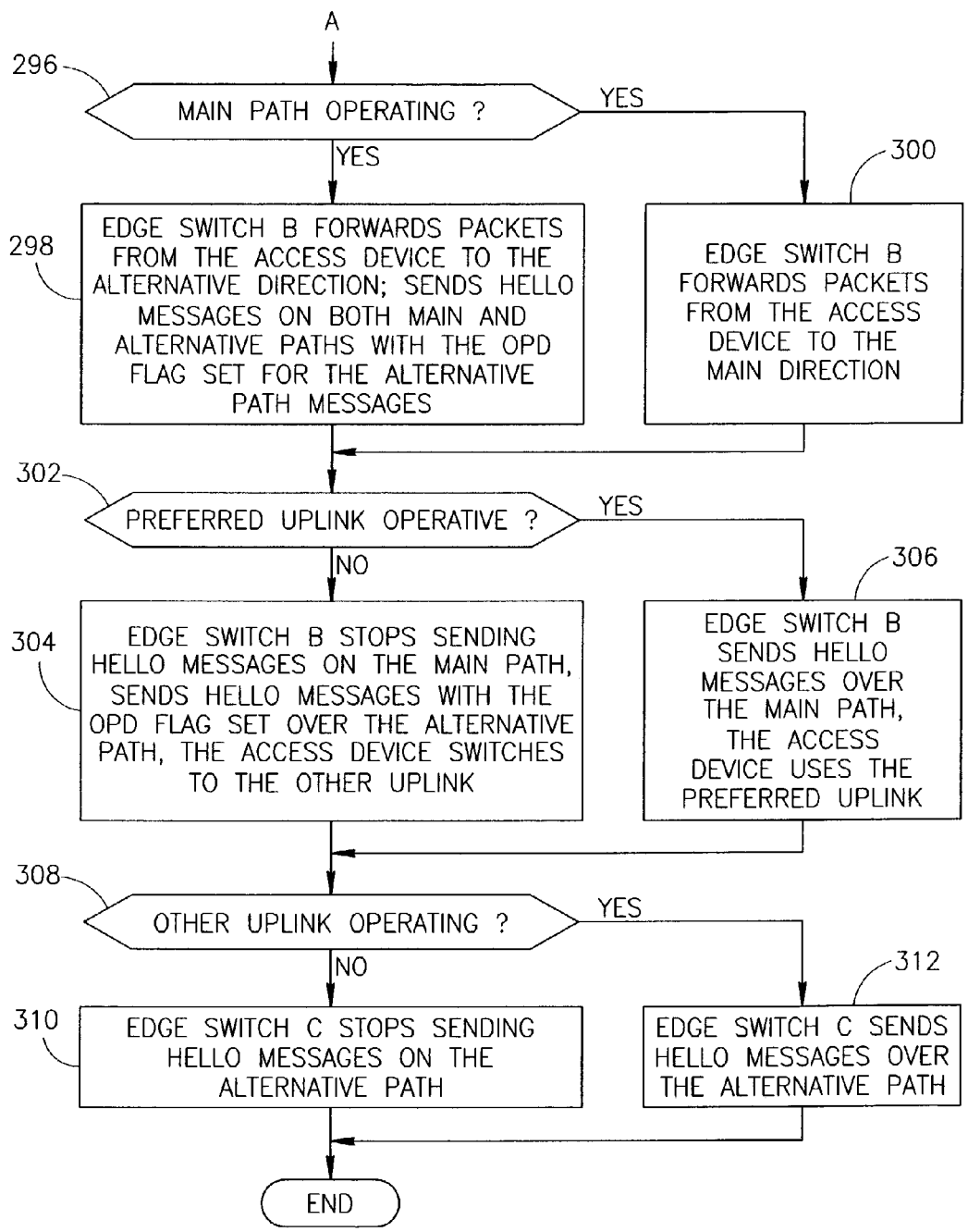

A flow diagram illustrating the end-to-end OAM based protection method of the present invention is shown in FIGS. 3A and 3B. With reference to FIGS. 1, 3A and 3B, in the example network 10, edge switch B performs the Hello protocol processing for monitoring the connectivity of the main path to the remote side of the connection. The egress behavior of edge switch B is to forward all packets received from the connection towards the access device (i.e. from the network) through its respective local uplink (step 290). In the event the edge switch is adapted to provide fast local protection as well (step 291), if the packet is tagged with the alternative VLAN arriving from the direction of the main path the edge switch does not forward the packet to the access device but instead forwards the packet along the alternative path (step 292).

Edge switch C performs Hello protocol processing for monitoring the connectivity of the alternative path to the remote side of the connection (step 293). Edge switch B is accessed for checking the status of the main path and edge switch C is accessed for checking the status of the alternative path. The egress behavior of edge switch C is to forward all packets received from the connection towards the access device (i.e. from the network) through its respective local uplink.

The ingress behavior is different for edge switches B and C. Edge switch C sends all packets received from the access device along the alternative path (step 294). Note that the access device only sends packets to edge switch C in the event the main uplink to edge switch B fails, thus providing a valid reason for using the alternative path. Edge switch B, on the other hand, must make a decision whether to send packets along the main path or the alternative path. If the main path is operative (step 296) as indicated by the Hello protocol, edge switch B forwards packets received from the access device to the main path (step 300). Otherwise, it forwards packets from the access device to the alternative path (step 298). When edge switch B switches to the alternative path, it sends Hello messages along the main as well as the alternative paths. In addition, the Hello packets it sends over the alternative path are sent with a flag set to indicate that other path (or tunnel) is down, i.e. Other Path Down (OPD) flag. The OPD flag functions to inform the remote side of the connection that the main path is down and that traffic should be moved to the alternative path.

In the event of a failure of the preferred uplink, which is the link between the edge port of B and access device A (step 302), edge switch B stops sending Hello packets over the main path. In this case, edge switch B sends Hello packets over the alternative VLAN path with the OPD flag set (step 304). As a result of the failure, the access device forwards packets to the alternative uplink. As long as the preferred uplink is operational, edge switch B sends Hello messages over the main path while the access device uses the preferred link (step 306).

As long as the alternative or other uplink from the access device to edge switch C is operative (step 308), edge switch C sends Hello messages over the alternative path (step 310). If the other uplink fails (e.g., the uplink or the edge port connected to the access device that terminates that connection fails), edge switch C stops sending Hello packets over the alternative VLAN path of a connection (step 312).

As long as the main path is operative, packets received over the main uplink are forwarded along the main path. If a failure along the main path occurs, edge switch B stops receiving Hello messages. In response, edge switch B sends Hello messages along the alternative path through edge switch C which forwards them along the alternative path. Note that edge switch C also sends Hello messages along the alternative path to cover the case where edge switch B fails and the alternative path is operational.

Local (Fast) Protection—Failure in the VLAN Stack

In accordance with the invention, point-to-point connections with a protection SLA are protected against any type of failure in the network, including failures in the network core, network edge or in the uplinks to the access devices. Use of the present invention can provide protection for point to point connections with fast-protection SLA in sub 50 millisecond range. The present invention provides for repair of failures in the uplinks connecting the dual-homing device or in the stack, such that connections are restored in sub 50 millisecond times. Failures in the core are protected in sub 50 milliseconds using MPLS-based fast-protection mechanisms.

Further, in accordance with an embodiment of the present invention, the end-to-end protection process takes effect a few seconds after the connection is protected by the local protection mechanism. This serves to optimize the path used for delivering the packets sent over the connection. In addition, if bandwidth is only allocated for the end-to-end main and alternative paths and not for local protection-tunnels, the switching to end-to-end protection also serves to ensure that after a few seconds, each connection uses only bandwidth previously allocated to it.

Failures in the network core are protected using local bypass tunnels as described in the MPLS fast-reroute draft. Failures in the VLAN stack are repaired using stack local protection mechanisms. An end-to-end protection scheme suitable for use with the present invention is described in more detail in U.S. Pat. No. 7,197,008 cited supra. Described is how the two end-points of a connection are notified when the connection goes through a local protection tunnel in the core. This capability enables the two ends of a connection to switch to an alternative end-to-end path a few seconds after local protection is effected, without packets having to go through protection tunnels in the core. A local protection scheme for repairing failures in the VLAN stack is described in U.S. Pat. No. 7,093,027 cited supra.

Figure 4:
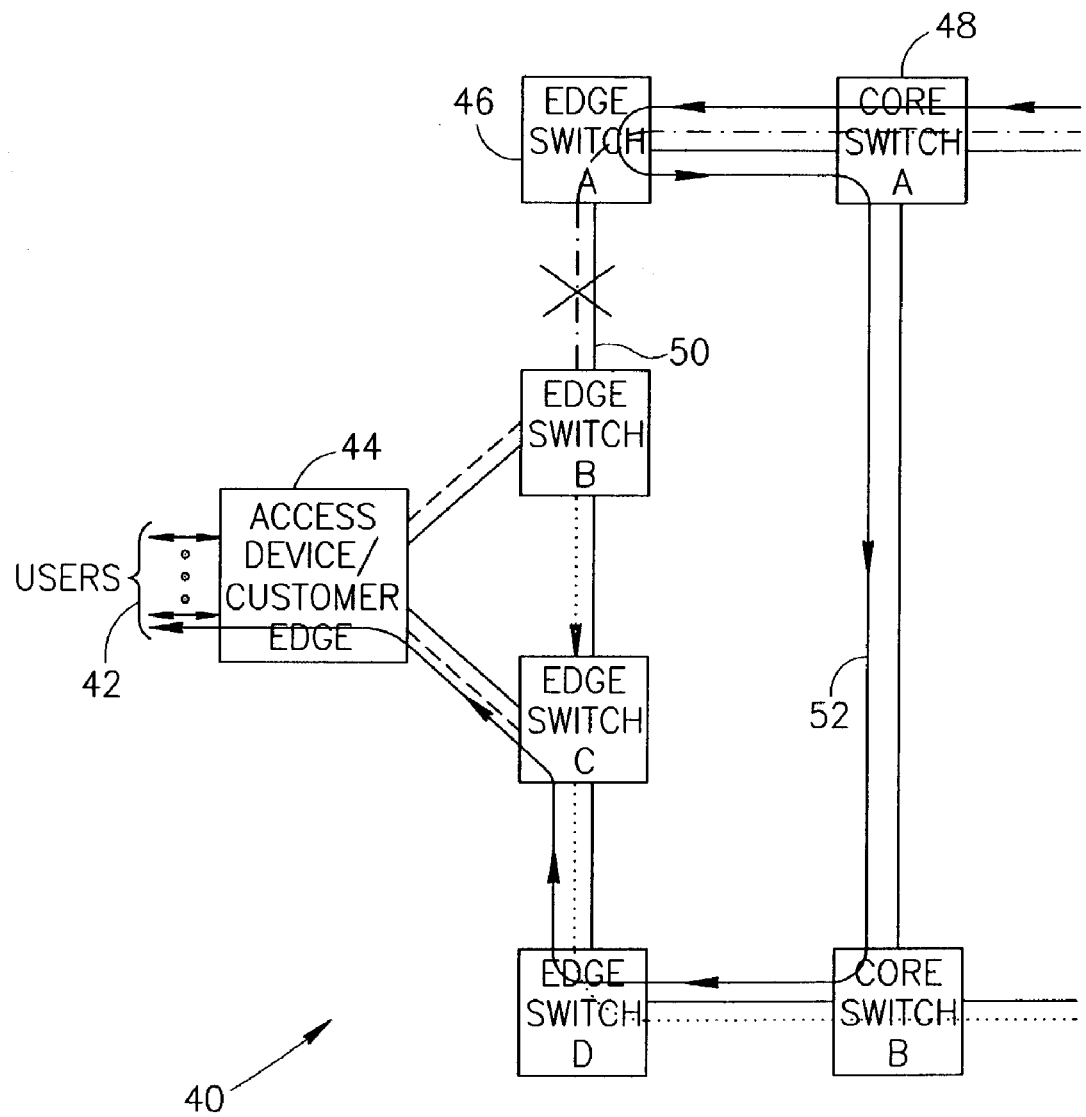
FIG. 4 is a diagram illustrating the local protection mechanism of the present invention and the resultant traffic flow for egress packets in the event of a failure along the main path in the VLAN stack portion.

A diagram illustrating the local protection mechanism of the present invention and the resultant traffic flow for egress packets in the event of a failure along the main path in the VLAN stack portion is shown in FIG. 4. The example network, generally referenced 40, is shown comprising an access device 44 connected to a plurality of users 42, edge switches 46, labeled edge switch A through D and core switches 48, labeled core switch A through B. Only a portion of the network is shown for clarity. Consider a failure in the VLAN stack in link 50 between edge switches A and B. A discussion of the protection mechanism for egress traffic is presented first followed by the protection mechanism for ingress traffic.

In accordance with the invention, an indication is sent in each hello packet. The indication is an Other Path Down (OPD) flag used to indicate that the main path is not operational.

Figure 5:
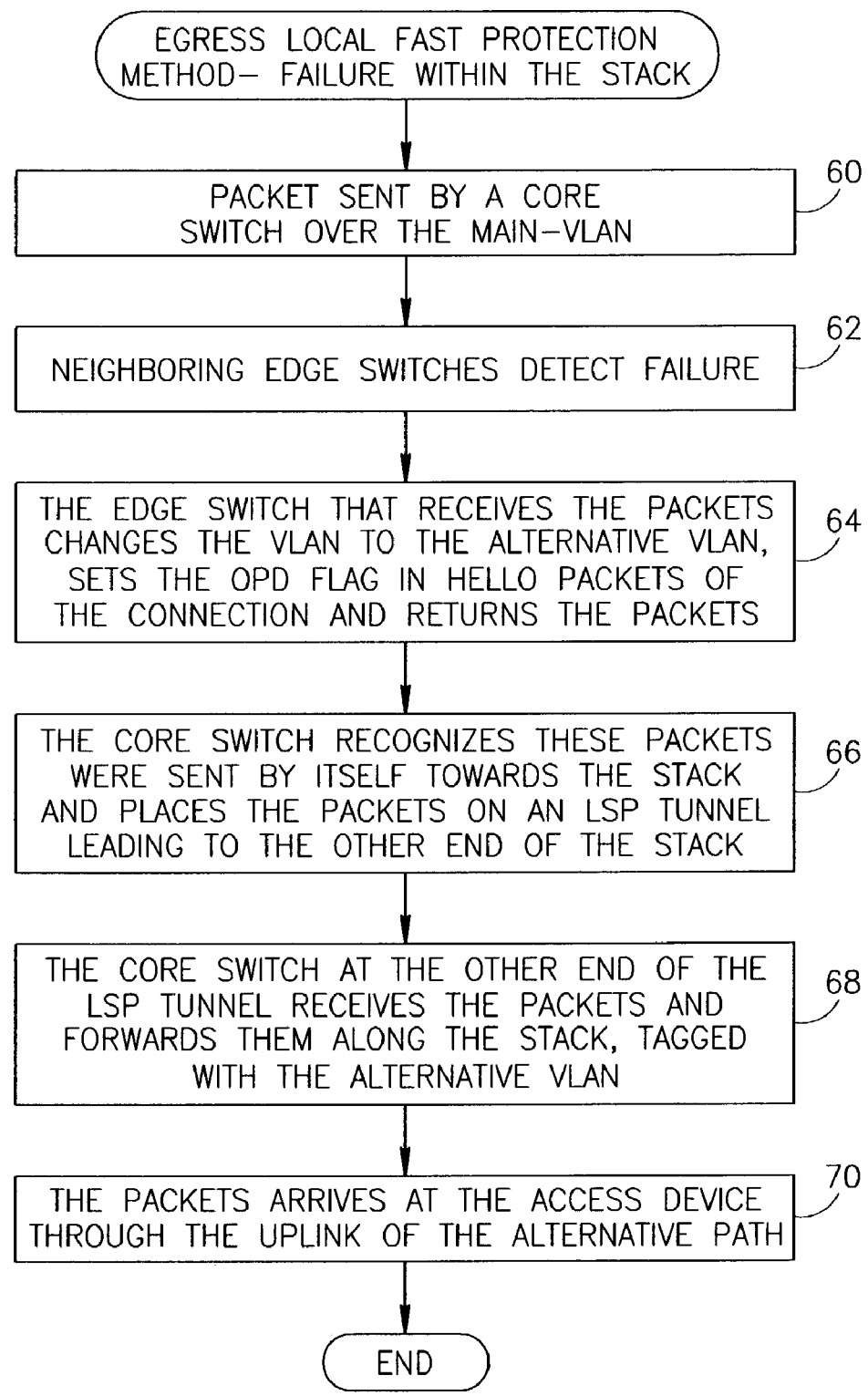
FIG. 5 is a flow diagram illustrating the egress local protection method of the present invention performed in the event of a failure along the main path in the VLAN stack.

A flow diagram illustrating the egress local protection method of the present invention performed in the event of a failure along the main path in the VLAN stack is shown in FIG. 5. With reference to FIGS. 3 and 4, failures in the VLAN stack are repaired as follows. Packets sent by the core switch (e.g., core switch A) towards the stack over the main path have their main-path flag set (step 60). The main-path flag indicates that the packet was sent by a core switch over the main VLAN path.

Repair of failures in the core portion of the network is described in the MPLS fast reroute draft. In the event of a failure along the main path within the VLAN stack, the neighboring edge switches on both sides of the failure detect the failure (step 62). The edge switch receiving the packets of the failed connection (edge switch A) changes the VLAN to the alternative VLAN of the same connection within the same stack and returns the packet at the failure point out on the same network port it was received on (step 64). In addition, the edge switch sets the OPD flag in Hello packets for that connection.

Note that the values assigned to main and alternative VLANs may be any desired values. Speed and efficiency can be greatly improved, however, by having the main and alternative VLAN-IDs differ in their least significant bits (LSBs). For example, main path VLAN-IDs may end in a zero bit while alternative path VLAN-IDs end with a one bit while the other bits of the VLAN-ID are identical for the main and alternative paths of the same connection within the same stack. Changing a packet to the alternative path of a connection can be achieved simply by having the packet processing engine (PPE) in the edge switch set the LSB of the VLAN-ID field of the packet.

The returned packets reach the core switch (core switch A) which recognizes that they were sent by itself towards the VLAN stack but were returned due to the failure. The packets are recognized as returned because the 'main-path' flag indication in the packets is set. In response, the core switch places the packets onto an LSP edge protection tunnel leading to the other end of the stack (step 66).

The core switch (core switch B) at the other end of the LSP protection tunnel receives the packets and forwards them along the stack, tagged with the alternative VLAN and with the 'main-path' flag not set (step 68). The packets are forwarded along the alternative path in the stack until they reach the edge device (edge switch C) connected to the access device. The packets reach the access device through the alternative-uplink (step 70). In the example, edge switch C forwards the packets to the access device 44 via the alternative-uplink. The route that the egress (i.e. remote to local) packets take in traveling from the core network to the access device in the event of a failure of the main path is shown by the solid arrowed line 52.

In the event that the link between the VLAN stack and the core switch fails (i.e. between edge switch A and core switch A), the core switch is adapted to perform label swapping of the VLAN-ID by setting the LSB, set the OPD flag if the packet is a Hello packet, add an MPLS header with an appropriate MPLS label and places the packet in the LSP protection tunnel. At the other end of the tunnel, the MPLS header is stripped and the packet continues over the alternative path in the VLAN stack.

Note that setting the OPD flag when performing local protection is important since it informs the end-point of the connection, which receives the Hello messages with the OPD flag set, that the original path is down, and that the end-to-end connection protection mechanism should be activated to switch the path from which the packet was received. This accelerates the time for the end-to-end protection mechanism to react, since it does not need to wait for a timeout on non-receipt of Hello packets over the failed path.

Figure 6:
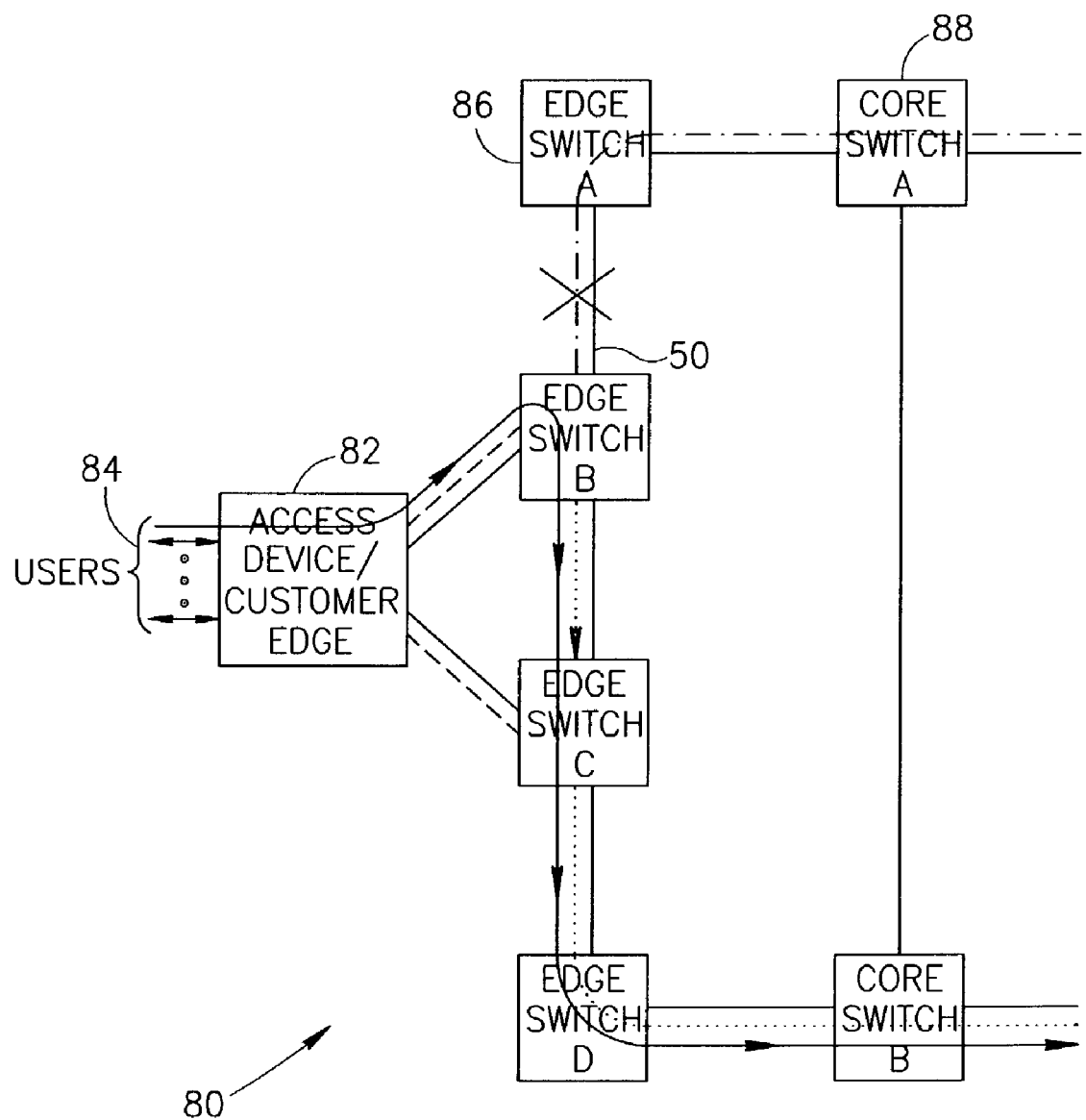
FIG. 6 is a diagram illustrating the local protection mechanism of the present invention and the resultant traffic flow for ingress packets in the event of a failure in the VLAN stack portion.

The ingress (i.e. local to remote) direction at the time of a failure of the main path will now be described. A diagram illustrating the local protection mechanism of the present invention and the resultant traffic flow for ingress packets in the event of a failure in the VLAN stack portion is shown in FIG. 6. The example network, generally referenced 80, is shown comprising an access device 82 connected to a plurality of users 84, edge switches 86, labeled edge switch A through D and core switches 88, labeled core switch A through B. Only a portion of the network is shown for clarity. Consider a failure in the VLAN stack in the link between edge switches A and B.

Figure 7:
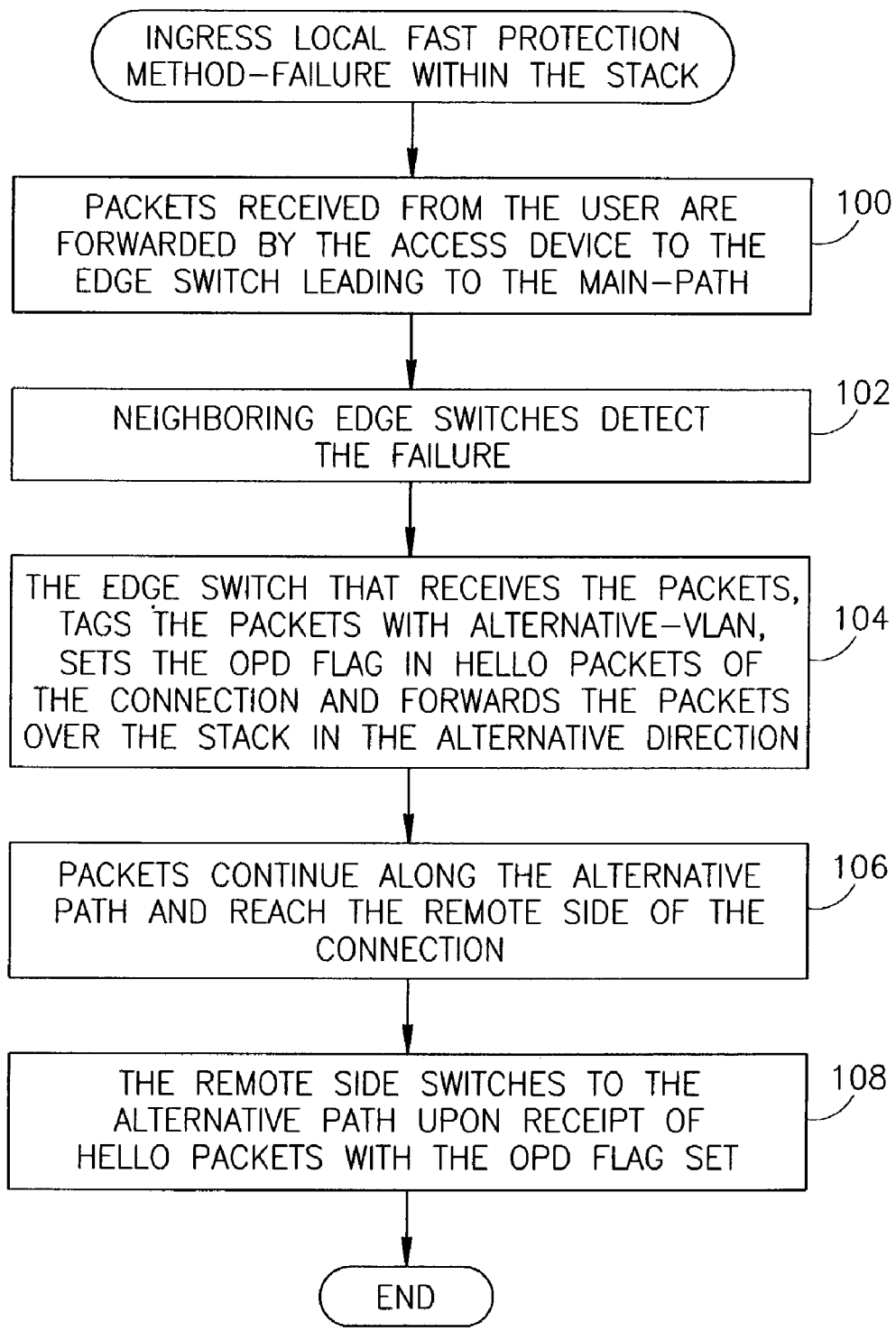
FIG. 7 is a flow diagram illustrating the ingress local protection method of the present invention performed in the event of a failure along the main path in the VLAN stack portion.

A flow diagram illustrating the ingress local protection method of the present invention performed in the event of a failure along the main path in the VLAN stack is shown in FIG. 7. With reference to FIGS. 5 and 6, failures in the VLAN stack are repaired as follows. Packets received from the user are forwarded by the access device to the edge switch (edge switch B) leading to the main path (step 100).

In the event of a failure along the main path within a VLAN-stack, the neighboring edge switches on either side of the failure detect the failure (step 102). The edge switch (edge switch B) that receives the packets, tags the packets with the alternative VLAN and returns the packets toward the alternative path (step 104). Hello packets are also returned in the alternative direction with the OPD flag indication set.

Note that if the failure was not between edge switch B and its neighbor (e.g., higher up in the stack), edge switch B would send the packets over the main path where they would continue along the stack until reaching the failure (e.g., failed link).

Once tagged with the alternative VLAN, the packets continue along the alternative path to the core network (core switch B) and reach the remote side of the connection (step 106). Upon receipt of the Hello packets, the remote side knows that the main path is down and switches to the alternative path (step 108). If the remote side is also a dual-homes access device, it may need to wait for the timeout for failure to receive Hello packets over the main path since Hello packets received from the alternative path do not arrive to the edge switch that receives packets from the access device. The route the ingress packets take in traveling from the access device to the core network in the event of a failure of the main path is shown by the solid arrowed line 92.

Note that the remote side switches to the alternative path when it receives from the alternative path Hello messages with the OPD flag set or times out on Hello packets from the main path. At this point, local protection of egress (remote-to-local) traffic is not required anymore, since packets do not arrive over the main path. The same is applicable for the local side: edge switch B does not receive Hello packets over the alternative path, but times out after a few seconds of not receiving Hello packets from the remote side along the main path. At that time it starts sending the traffic over the alternative path by itself, so the ingress (local-to-remote) fast protection is not required anymore.

It is important to note that the packet processing engine (PPE) in edge switched B and C are adapted such that packets arriving from the main path direction tagged with the alternative VLAN, continue along the stack and are not forwarded to the access device.

Local (Fast) Protection—Failure in an Uplink

The protection mechanism of the present invention in the event of a failure in the uplink between the access device and edge switch will now be described. The ingress behavior of the mechanism will be described first followed by the egress behavior.

Figure 8:
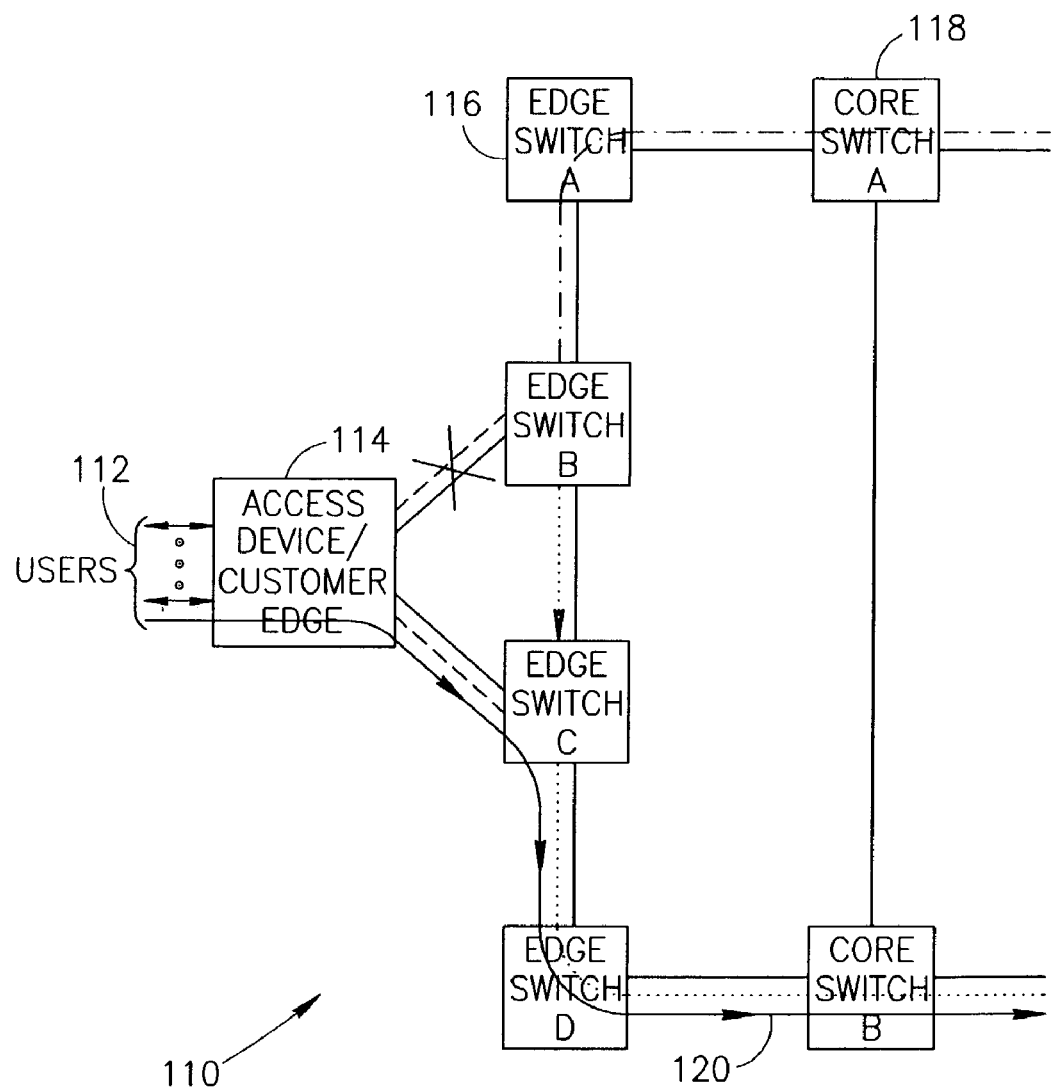
FIG. 8 is a diagram illustrating the local protection mechanism of the present invention and the resultant traffic flow for ingress packets in the event of a failure in the main uplink of a connection.

A diagram illustrating the local protection mechanism of the present invention and the resultant traffic flow for ingress packets in the event of a failure in the main uplink is shown in FIG. 8. The example network, generally referenced 110, is shown comprising an access device 114 connected to a plurality of users 112, edge switches 116, labeled edge switch A through D and core switches 118, labeled core switch A through B. Only a portion of the network is shown for clarity. Consider a failure in the main uplink (i.e. the preferred uplink for the specific connection currently under discussion) between the access device and edge switch B.

Figure 9:
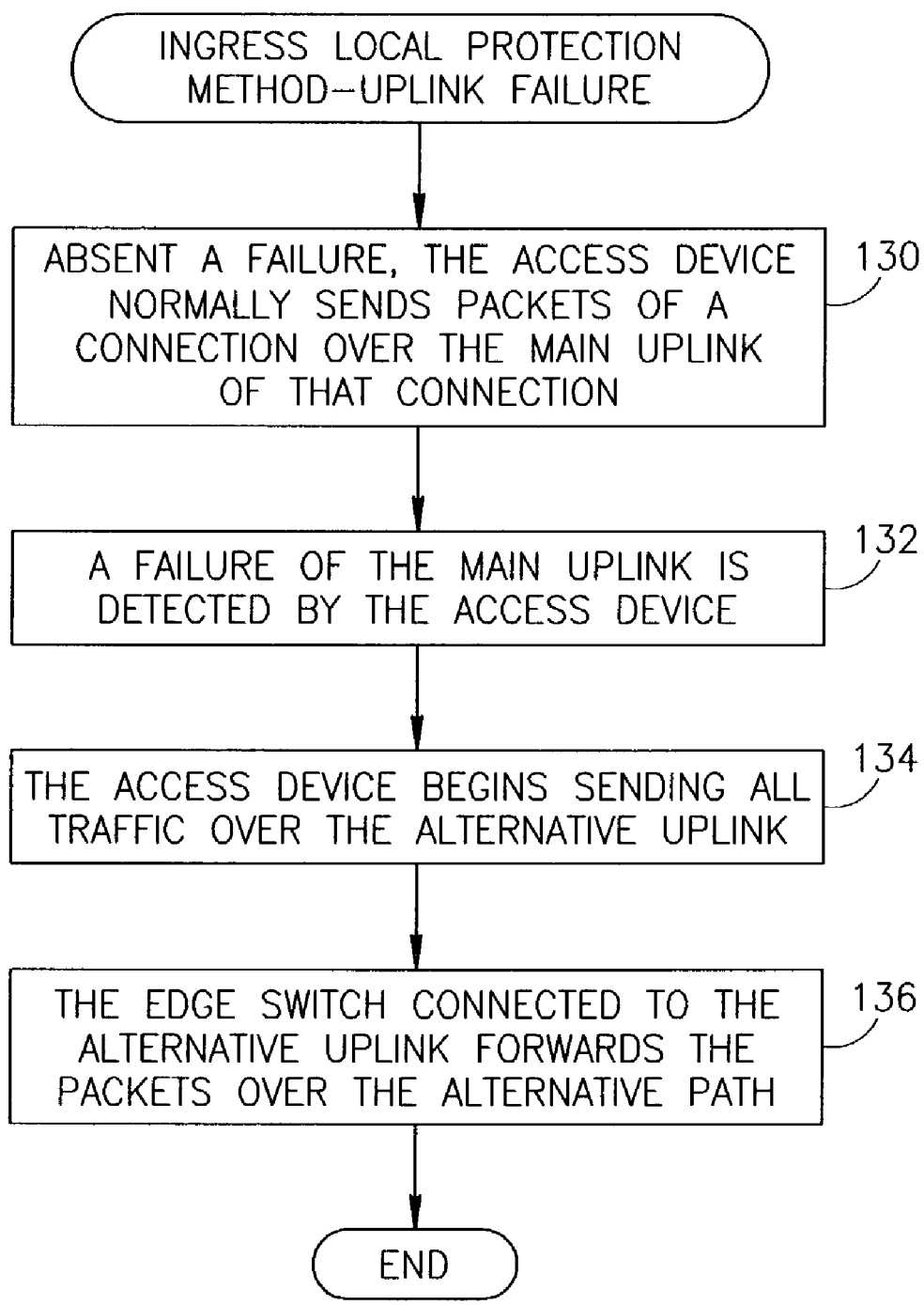
FIG. 9 is a flow diagram illustrating the ingress local protection method of the present invention performed in the event of a failure in the main uplink of a connection.

A flow diagram illustrating the ingress local protection method of the present invention performed in the event of a failure in the main uplink is shown in FIG. 9. With reference to FIGS. 7 and 8, a failure in the main uplink is repaired as follows. Packets received from the user, which belong to a specific connection, are normally forwarded (absent a failure) by the access device to the edge switch (e.g., edge switch B) over the main uplink of that connection (step 130).

A failure in the main uplink is detected by the access device and the edge switch (step 132). In response, the access device begins sending all traffic over the alternative uplink (step 134). As described supra, the main and alternative uplinks are part of the LAG configured in the access device. The edge switch connected to the alternative uplink (edge switch C), tags the packets with the alternative VLAN and forwards them over the alternative path (step 136). The route the ingress packets take in traveling from the access device to the core network in the event of a failure of the main uplink is shown by the solid arrowed line 120.

Figure 10:
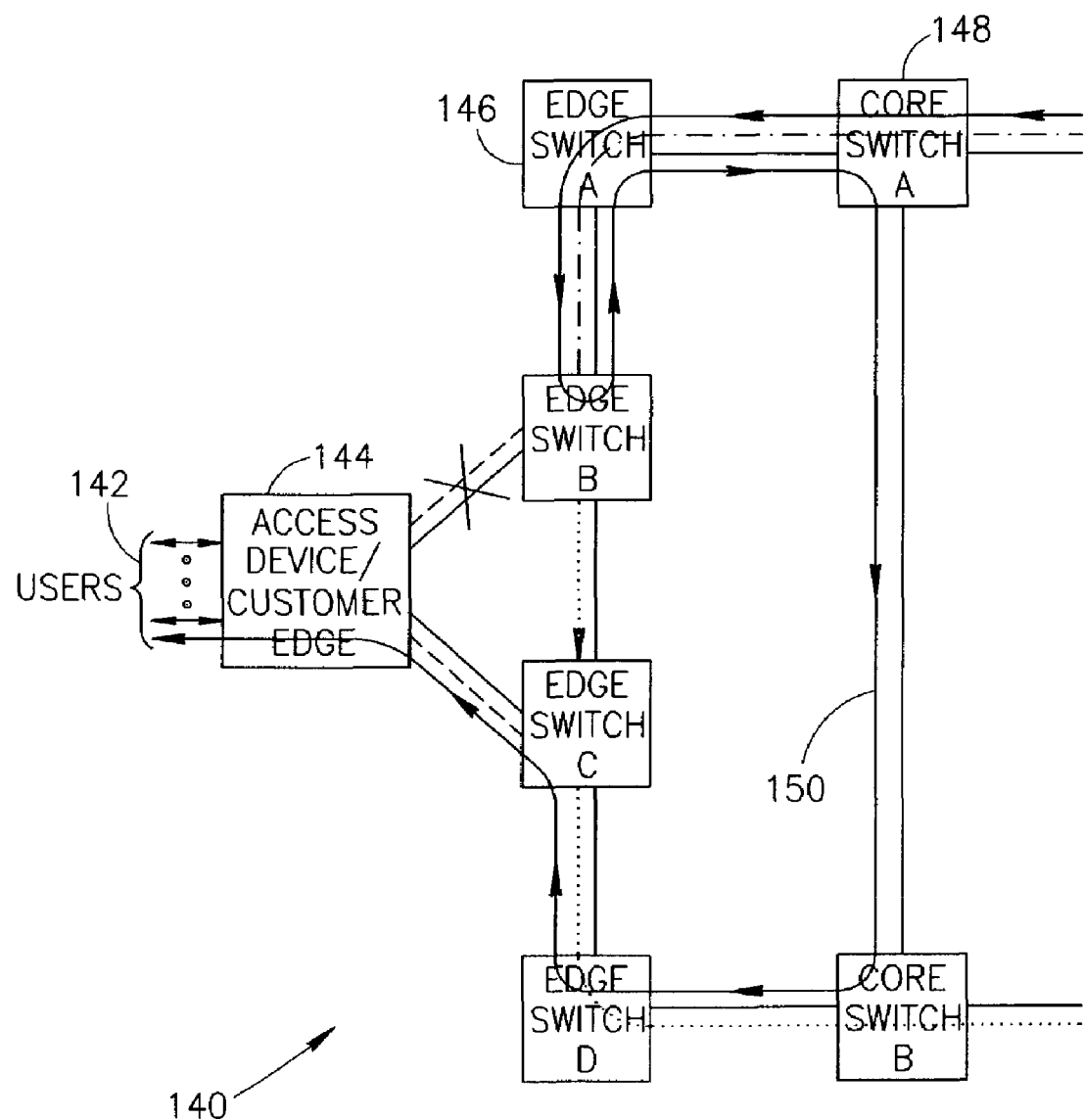
FIG. 10 is a diagram illustrating the local protection mechanism of the present invention and the resultant traffic flow for egress packets in the event of a failure in the main uplink of a connection.

The egress behavior at the time of a failure of the main uplink will now be described. A diagram illustrating the local protection mechanism of the present invention and the resultant traffic flow for egress packets in the event of a failure in the main uplink is shown in FIG. 10. The example network, generally referenced 140, is shown comprising an access device 144 connected to a plurality of users 142, edge switches 146, labeled edge switch A through D and core switches 148, labeled core switch A through B. Only a portion of the network is shown for clarity. Consider a failure in the main uplink of a specific connection between the access device and edge switch B.

Figure 11:
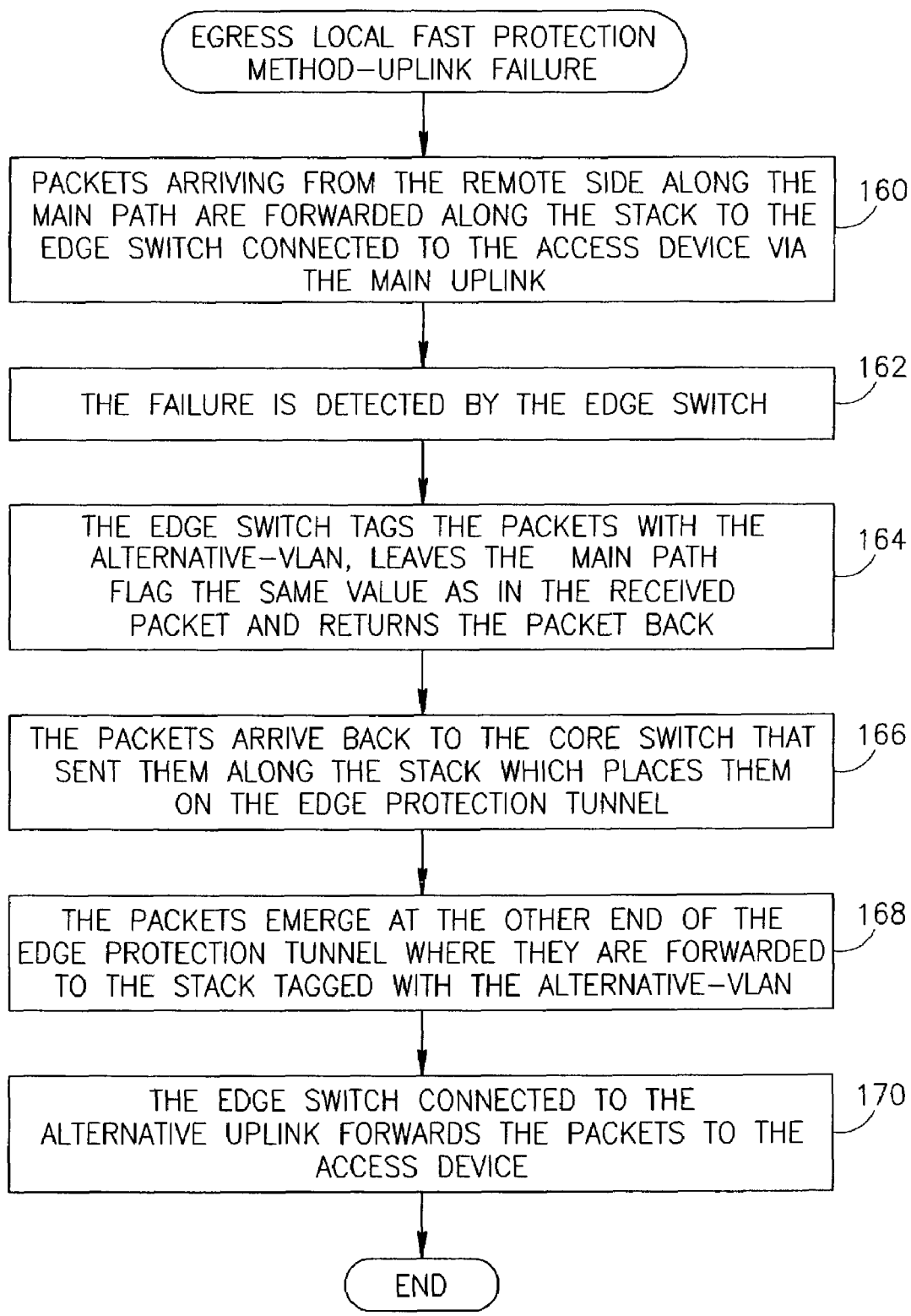
FIG. 11 is a flow diagram illustrating the egress local protection method of the present invention performed in the event of a failure in the main uplink of a connection.

A flow diagram illustrating the egress local protection method of the present invention performed in the event of a failure in the main uplink is shown in FIG. 11. With reference to FIGS. 9 and 10, failures of an uplink are repaired as follows. Packets arriving from the remote side along the main path of a specific connection are forwarded along the stack to the edge switch (edge switch B) connected to the access device by the main uplink of that connection (step 160).

A failure in the main uplink of the connection is detected by the access device and the edge device (edge device B) (step 162). The edge device (edge device B) cannot forward the packets to the destination port (i.e. the access device) since the port has failed. Therefore, the edge device tags the packets with the alternative VLAN, leaves the "main-path" flag at the same value as in the received value and returns the packet towards the alternative path via the same network port the packet was received on (step 164). Note that the "main-path" flag would typically be set since the packet was originally sent by a core switch over the main VLAN path. Edge device B also sets the OPD flag in return packets.

The packets arrive back at the core switch (core switch A) that originally sent them along the main path. This core switch then places the packets in an edge protection tunnel (step 166). The packets emerge at the other end of the tunnel at the other core switch (core switch B) where they are forwarded to the VLAN stack tagged with the alternative VLAN (step 168). The edge switch (edge switch C) connected to the alternative uplink receives the packets and forwards them to the access device (step 170). The route the egress packets take in traveling from the core network to the access device in the event of a failure of the main uplink is shown by the solid arrowed line 150.

A few seconds after fast protection occurs, the end-to-end protection is effected, due to receiving packets with the OPD flag or timing out on receipt of Hello messages. This provides bandwidth and path optimization.

Note that in order for the protection mechanism of the present invention to provide sub 50 millisecond restoration for egress traffic in the event of a failure in the uplink between the access device and an edge switch, the edge switch software must be capable of identifying a failure in a user edge port and inform the PPE about the failure in sub 50 millisecond time frame. The PPE in the edge switch comprises means for sending packets received over the main path and destined to user edge ports that have failed, back to the network port from which they arrived, tagged with the alternative VLAN and with the "main-path" flag unchanged.

Special Case Topologies

Two special cases that may arise are described below in connection with the dual home access device protection mechanism of the present invention. The first involves a network topology wherein a connection is established between two access devices connected to the same VLAN stack. The second involves a network topology wherein a connection is established between two access devices connected to two different VLAN stacks which are connected to the same core switch on each side.

Figure 12:
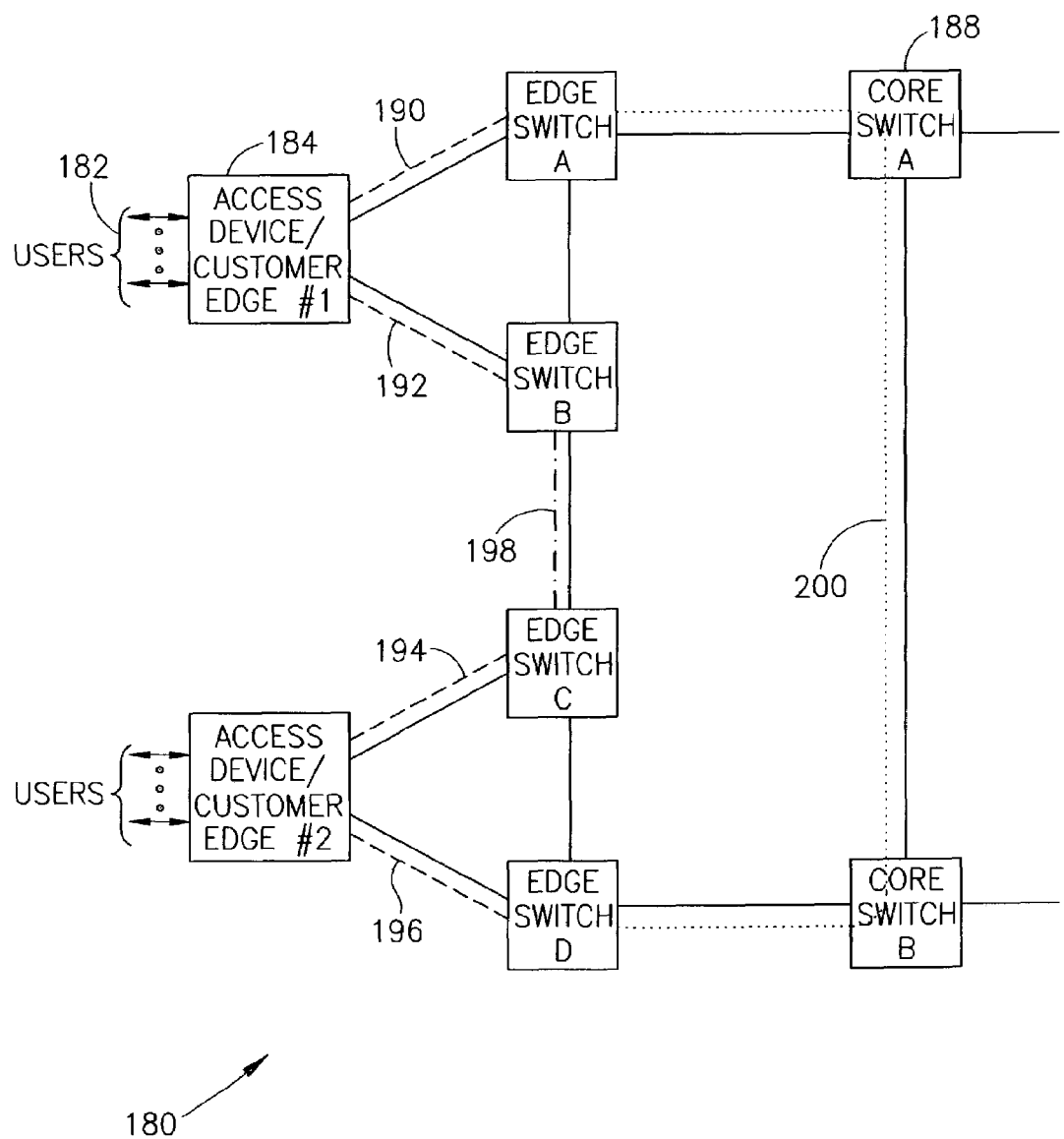
FIG. 12 is a diagram illustrating the provisioning in the event of a connection between two access devices connected to the same VLAN stack.

The first special case topology will now be described. A diagram illustrating the provisioning in the event of a connection between two access devices connected to the same VLAN stack is shown in FIG. 12. The example special case network topology, generally referenced 180, is shown comprising two access devices 184, labeled AD/CE #1 and AD/CE #2, each connected to a plurality of users 182, edge switches 186, labeled ES A through ES D and core switches 188, labeled CS A through CS B. Only a portion of the network is shown for clarity.

The dashed lines 190, 192 represent the VLAN allocated for a connection at AD/CE 1. The dashed lines 194, 196 represent the VLAN allocated for the same connection at AD/CE 2. One possible provisioning scheme is to have the dotted-dashed line 198 serve as the main path of the connection while the dotted line 200 serves as the alternative path for the connection. Another possible provisioning scheme is to the dotted line 200 serve as the main path of the connection and the dotted-dashed line 198 serve as the alternative path.

A problem arises in that the above two provisioning options may not be possible. This is because AD/CE 1 and AD/CE 2 themselves mandate the main and alternative directions according to their respective LAG distribution functions. The LAG distribution function in AD/CE 1 may or may not be coordinated with the LAG distribution function in AD/CE 2. For example, if the LAG distribution function of AD/CE 1 determines that packets of VLAN 190, 192 prefer the uplink going to edge switch A, while the LAG distribution function of AD/CE 2 determines that packets of VLAN 194, 196 prefer to go through the uplink going to edge switch C, then the two access devices cannot agree on a single main path. In this case AD/CE 1 needs the dotted VLAN 200 to be the main path, while AD/CE 2 needs the dotted-dashed VLAN 198 to be the main path, resulting in a conflict.

The present invention provides two possible solutions for this problem. In the first solution, the VLANs are allocated in such a way that AD/CE 1 and AD/CE 2 agree on the main and alternative path. Note that this assumes that the LAG distribution function is according to the VLAN and that there is control over the VLANs that the AD/CE devices use for connections.

A second solution (if the above assumptions are not valid) is to use two connections to implement the single point-to-point service connectivity between AD/CE 1 and AD/CE 2: one connection for packets sent from AD/CE 1 to AD/CE 2, and a second connection for packets sent from AD/CE 2 to AD/CE 1. The connection for packets sent from AD/CE 1 to AD/CE 2 uses a main path determined according to the path to which AD/CE 1 sends its packets absent a failure. The connection for packets sent from AD/CE 2 to AD/CE 1 uses the main path determined according to the path to which AD/CF 2 sends its packets absent a failure.

Figure 13:
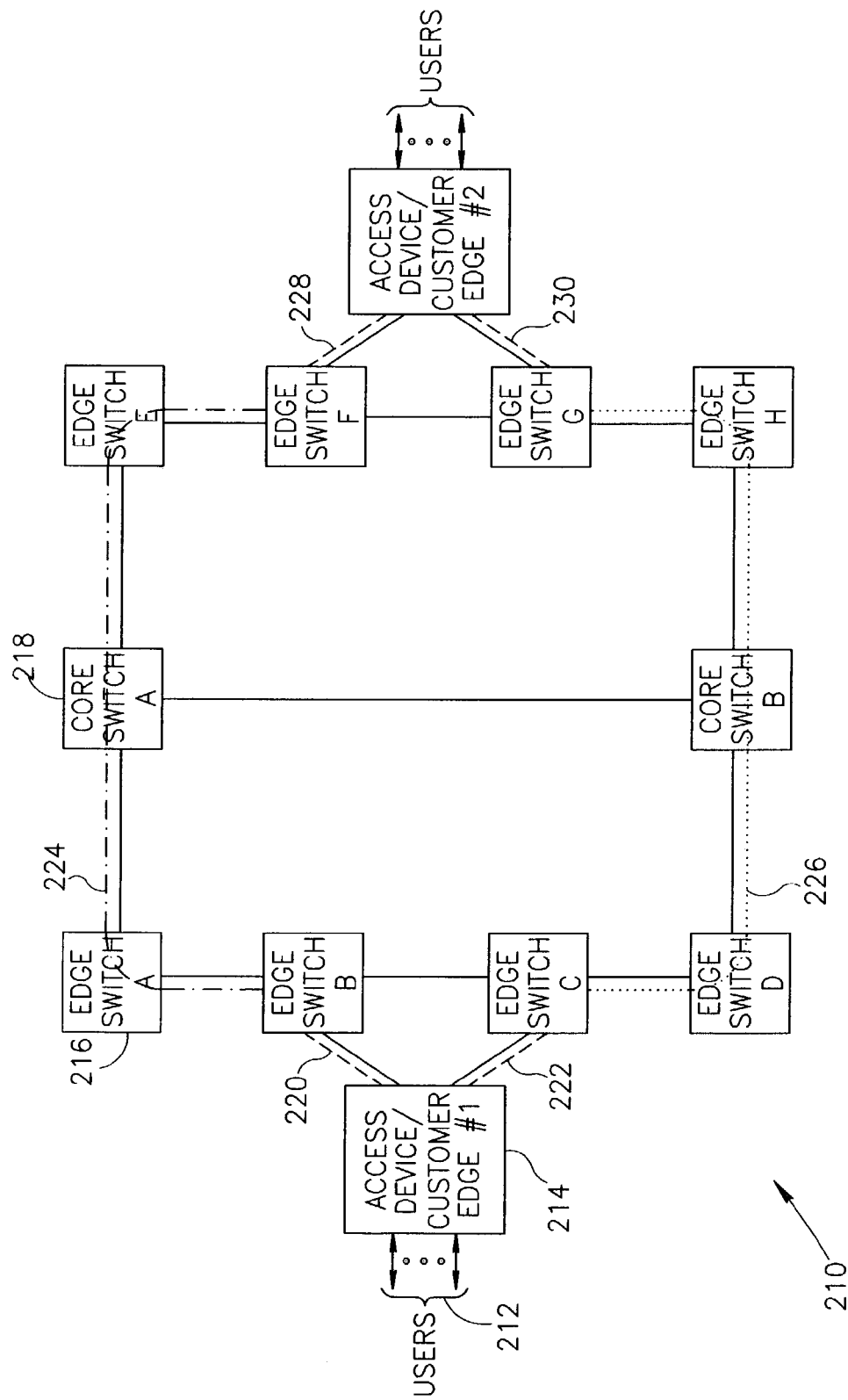
FIG. 13 is a diagram illustrating the provisioning in the event of a connection between two access devices connected to two VLAN stacks that are connected to the same core switch.

The second special case will now be described. A diagram illustrating the provisioning in the event of a connection between two access devices connected to two VLAN stacks that are connected to the same core switch on each side is shown in FIG. 13. The example special case network topology, generally referenced 210, is shown comprising two access devices 214, labeled AD/CE #1 and AD/CE #2, each connected to a plurality of users 212, edge switches 216, labeled ES A through ES H and core switches 218, labeled CS A through CS B.

The dashed lines 220, 222 represent the VLAN allocated for a connection at AD/CE 1. The dashed lines 228, 230 represent the VLAN allocated for the same connection at AD/CE 2. In this topology, the provisioning of the main and alternative paths must be made as shown, with the availability of two options. The first option is that the dotted-dashed line 224 is provisioned as the main path while the dotted line 226 is provisioned as the alternative path. The second option is to provision the dotted-dashed line 224 as the alternative path and the dotted line 226 as the main path.

The reason for this is that if the paths are provisioned any other way, core switches A and B become single points of failures for the network. For example, if the main VLAN path starts at edge switch B, passes through the stack to core switch A, from there passes to cores switch B and through the other stack to edge switch G, then the alternative VLAN must use edge switches C and F. Consequently, the alternative VLAN will start at edge device C, continue to core switch B, to core switch A and then to edge switch F. Now, however, if either of core switches A or B fails, both the main and alternative paths fail.

As in the first special case described supra, the assignment of the main and alternative side between the two AD/CE devices must be coordinated. In this special topology case, it is required that (1) the LAG distribution function in AD/CE 1 prefer the link to edge switch B as its main uplink and (2) the LAG distribution function in AD/CE 2 prefer the link to edge switch F as its main uplink. An alternative requirement is to have (1) the LAG distribution function in AD/CE 1 prefer the link to edge switch C as its main uplink and (2) the LAG distribution function in AD/CE 2 prefer the link to edge switch G as its main uplink.

As in the first special case, the present invention provides two possible solutions for this problem. In the first solution, the access devices are used having a LAG distribution function that has the VLAN as a parameter. VLAN allocations are controlled at AD/CE 1 and AD/CE 2 in such that the core switches are not single points of failures.

The second solution is to use two separate connections to implement the single point-to-point service connectivity between AD/CE 1 and AD/CE 2: one connection for packets sent from AD/CE 1 to AD/CE 2, and a second connection for packets sent from AD/CE 2 to AD/CE 1. The connection for packets sent from AD/CE 1 to AD/CE 2 uses a main path determined according to the path to which AD/CE 1 sends its packets absent a failure. The connection for packets sent from AD/CE 2 to AD/CE 1 uses the main path determined according to the path to which AD/CE 2 sends its packets absent a failure.

Edge Switch Embodiment

A network device can be adapted to implement the end-to-end and fast protection mechanism of the present invention. Hardware means and/or software means adapted to execute the mechanism may be incorporated within a network device such as a core switch, edge switch, Network Management System, Label Switching Router (LSR), network switch or any other wired or wireless network device. The device may be constructed using any combination of hardware and/or software.

Figure 14:
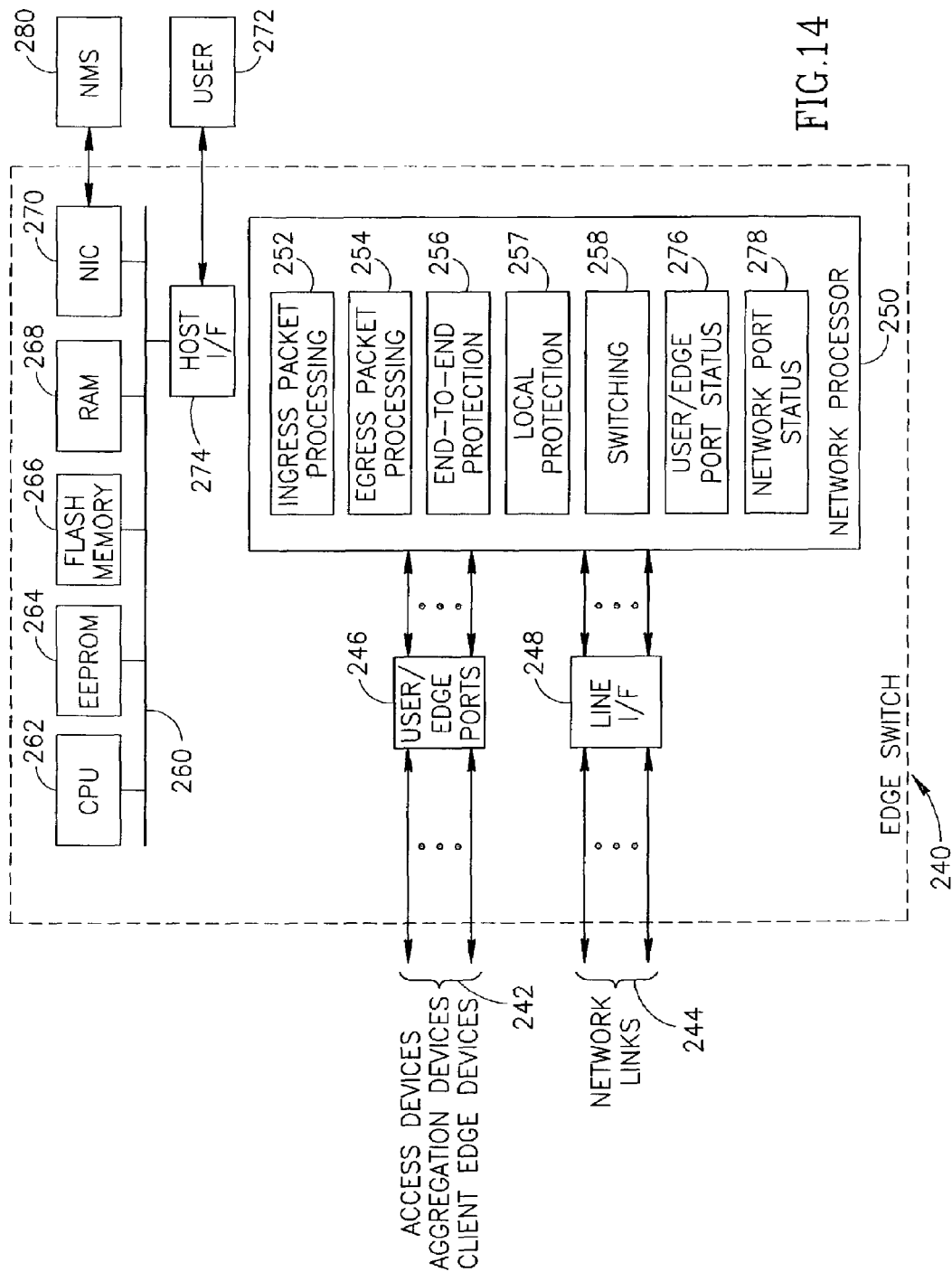
FIG. 14 is a block diagram illustrating an example edge switch incorporating the dual homed access device protection mechanism of the present invention.

A block diagram illustrating an example edge switch incorporating the dual homed access device protection mechanism of the present invention is shown in FIG. 14. The network device, generally referenced 240, comprises at its core a network processor 250, link interface cards 248, edge ports 246, a network interface 270 for interfacing the network device to an NMS 280, a central processor 262, e.g., CPU, and both volatile and non-volatile memory including RAM memory 268 for storing data and application program code, Flash memory 266 for storing boot and application code and EEPROM 264 for storing configuration data. The CPU communicates to the network processor, memory peripherals and other support devices via a bus 260.

The edge switch 240 comprises an edge side and a network side. The one or more line interface cards 248 provide the PHY interface to two-way communication links 244. As an example, the line interface cards may be adapted to interface to any combination of the following communication links: any variety of copper or optical based Ethernet, Token Ring, FDDI, SONET/SDH, ATM, RPR.

A plurality of edge ports 246 are provided for connecting directly or indirectly through access/aggregation devices to a plurality of users 242. The edge side interfaces to the user device (i.e. CE) or to access or aggregation devices via any suitable type of interface, e.g., Gigabit Ethernet (GE), Fast Ethernet (FE), PDH interface (e.g., T1/E1), etc. Likewise, the network side interfaces to other edge switches or the core network via any suitable interface such as Optical Ethernet (e.g., 1GE, 10GE, etc.), TDM, RPR, etc. A plurality of edge switches may be connected to each other to form a stack whereby the edge switches at the ends of the stack are connected to core switches. In this case, connections may be built using both VLAN and MPLS based technology. Alternatively, the network may comprise only edge switches whereby a plurality of edge switches are connected in a ring topology.

The network processor 250 implements the switching fabric (switching block 258) for providing the switching functionality of the device. Depending on the specific implementation, the switching fabric may comprise, for example, hardware for performing VLAN tagging, MPLS, Frame Relay, ATM switching, CSIX or any other fabric to network interface protocol. The network processor includes one or more packet processing engines (PPE) that comprises an ingress packet processor 252 and an egress packet processor 254. In addition, an end-to-end protection module 256 implements the dual homed end-to-end protection mechanism of the present invention including Hello message processing for connections, path switching, etc. as described in detail hereinabove. A local protection module 257 performs the dual homed local protection mechanism of the present invention. The network processor also comprises timestamp circuits, clock circuits, memory, counters and CPU interface (not shown). The network processor may be implemented as a microcontroller, microprocessor, microcomputer, ASIC core, FPGA core, central processing unit (CPU) or digital signal processor (DSP) or any other suitable computing means.

The network processor comprises edge port status register 276 for maintaining the operational status of each edge port. Similarly, a network port status register 278 is adapted to maintain the operational status of each network port. The output of both registers is used to provide the operational status of both user and network ports which is used by the ingress and egress packet processors in determining whether to change the VLAN-ID of a packet to an alternative VLAN and send it back to the network port from which it was received in accordance with the protection mechanism of the present invention as described in detail supra. If the operational status of a port indicates it is down or non-operational, received packets that were to be forwarded towards that port are tagged with the respective alternative VLAN by setting the LSB of the VLAN-ID and are returned back to the same network port they were received on. In addition, the OPD flag is set in Hello packets of these connections before they are returned back.

The network device also comprises a NIC 270 for providing an out of band interface for connecting to external entities such as a craft for local maintenance and configuration purposes, a NMS for centralized provisioning, administration and control or a Local Area Network (LAN). The network device may comprise additional interfaces, such as a serial interface for connecting to a PC for configuration purposes.

The central processor 262 implements the major functionality of the edge switch including higher software layer processing. Note that the central processor may be implemented in any suitable manner such as a microcontroller, microprocessor, microcomputer, ASIC core, FPGA core, central processing unit (CPU) or digital signal processor (DSP) or any other computing means.

The edge ports and network ports may be implemented on one or more line interface cards that provide the PHY interface to bidirectional communication links, in addition to the MAC interface. Note that the invention is not limited to any particular line interface type or link speed. In addition, the invention is not limited to any particular number of user or network ports, as any number of links of each type may be used. Further, the line interface cards may be adapted to interface to any type of communication links such as any variety of copper or optical based Ethernet, Token Ring, FDDI, SONET/SDH, PDH, ATM, RPR, etc.

The network device also comprises an optional user interface adapted to respond to user inputs and provide feedback and other status information. A host interface 274 enables communication with a user 272 or host computing device. The host may be adapted to configure, control and maintain the operation of the device. The device may also comprise magnetic storage device means for storing application programs and data.

The network device comprises computer readable storage medium for storing program code and data which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the dual homed access device protection mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform the dual homed access device protection mechanism of the present invention or any portion thereof may also reside, in whole or in part, in the static or dynamic main memories or in firmware within the processor of the switch (i.e. within microcontroller, microprocessor, microcomputer, DSP, etc. internal memory).

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of providing per connection end-to-end protection for a dual homed device connected to a first network device via a first uplink and a second network device via a second uplink, said first network device and said second network device part of a Virtual Local Area Network (VLAN) stack, said method comprising the steps of:

provisioning a main path from said first network device and an alternative path from said second network device to a remote end of said connection;

provisioning one or more VLANs for connection at said dual homed device;

first providing end-to-and protection for said dual homed device, said step of first providing comprising the steps of:

sending and receiving Operation, Administration & Maintenance (OAM) packets periodically over said main path by said first network device to verify connectivity to said remote end of said connection;

if connectivity fails, sending ingress packets towards said alternative path and setting an Other Path Down (OPD) flag in said OAM packets to inform said remote end that said main path is down and to switch traffic to said alternative path;

second providing ingress local fast protection for failures within said VLAN stack, said step of second providing comprising the steps of:

detecting a failure within said VLAN stack and tagging packets sent toward said main path with said alternative path, setting said OPD flag in OAM packets and forwarding said tagged packets and said OAM packets along said alternative path;

switching traffic to said alternative path at said remote end upon receipt of OAM packets with said OPD flag set;

third providing ingress local fast protection for failures in said first uplink, said step of third providing comprising the steps of:

detecting a failure of said first uplink and sending all traffic from said dual homed device over said second uplink to said second network device in response thereto; and tagging packets received by said second network device with said alternative path and forwarding said tagged packets over said alternative path.

2. The method according to claim 1, wherein said dual homed device comprises an access device or an aggregation device.

3. The method according to claim 1, wherein said dual homed device comprises a customer edge device.

4. The method according to claim 1, wherein said first network device and said second network device comprise edge switches.

5. The method according to claim 1, wherein OAM packets comprise packets of a Hello protocol.

6. The method according to claim 1, wherein indication of a failure of said first uplink or said second uplink is conveyed to said remote side of a connection using an OAM protocol.

7. The method according to claim 6, wherein indication of a failure of said first uplink or said second uplink is conveyed to said remote side of a connection by ceasing the transmission of Hello packets.

8. The method according to claim 1, wherein OAM packets are sent and received over said alternative path by said second network device for checking the connectivity to said remote end of said connection over the alternative path and to inform said remote end of failures in said alternative path or in said second uplink.

9. The method according to claim 1, wherein packets of the connection are sent over the main path as long as said main path and said preferred uplink are operational.

10. The method according to claim 1, further comprising the step of marking OAM packets sent over said alternative path so as to indicate that the main path is down.

11. The method according to claim 10, wherein said step of marking comprises setting an Other Path Down (OPD) flag in Hello packets sent over said alternative path.

12. A method of providing per connection end-to-and protection for a dual homed device connected to a first network device via a first uplink and a second network device via a second uplink, said first network device and said second network device part of a Virtual Local Area Network (VLAN) stack, said method comprising the steps of:
provisioning a main path from said first network device and an alternative path from said second network device to a remote end of said connection;
provisioning one or more VLANs for connection at said dual homed device;
first providing end-to-and protection for said dual homed device, said step of first providing comprising the steps of:
sending and receiving Operation, Administration & Maintenance (OAM) packets periodically over said main path by said first network device to verify connectivity to said remote end of said connection;
if connectivity fails, sending ingress packets towards said alternative path and setting an Other Path Down (OPD) flag in said OAM packets to inform said remote and that said main path is down and to switch traffic to said alternative path;
second providing egress local fast protection for failures within said VLAN stack, said step of second providing comprising the steps of:
detecting a failure within said VLAN stack and tagging packets received from a first core switch over said main path with said alternative path, setting said OPD flag in OAM packets and returning packets toward said first core switch along said main path;
placing said returned packets onto a protection tunnel leading to the other end of said VLAN stack;
forwarding packets received from said protection tunnel toward said VLAN stack tagged with said alternative path and with a main-path flag cleared;
receiving packets at said dual homed device via said second uplink over said alternative path;
third providing egress local fast protection in said first uplink, said step of third providing comprising the steps of:
detecting a failure of said first uplink, lagging packets received along said main path with said alternative path, leaving said main-path flag intact and returning said packets;
receiving packets at an originating second core switch and placing said packets on a protection tunnel leading to the other end of said VLAN stack;
forwarding packets received from said protection tunnel toward said VLAN stack tagged with said alternative path and with a main-path flag cleared; and
receiving packets at said dual homed device via said second uplink over said alternative path.

13. The method according to claim 12, wherein said dual homed device comprises an access device or an aggregation device.

14. The method according to claim 12, wherein said dual homed device comprises a customer edge device.

15. The method according to claim 12, wherein said first network device and said second network device comprise edge switches.

16. The method according to claim 12, wherein OAM packets comprise packets of a Hello protocol.

17. The method according to claim 12, wherein said step of receiving packets at an originating second core switch comprises recognizing packets at said second core switch sent by itself by detecting that said main-path flag is set.

18. The method according to claim 17, wherein indication of a failure of said first uplink or said second uplink is conveyed to said remote side of a connection by ceasing the transmission of Hello packets.

19. The method according to claim 12, wherein OAM packets are sent and received over said alternative path by said second network device for checking the connectivity to said remote end of said connection over the alternative path and to inform said remote end of failures in said alternative path or in said second uplink.

20. The method according to claim 12, wherein packets of the connection are sent over the main path as long as said main path and said preferred uplink are operational.

21. The method according to claim 12, further comprising the step of marking OAM packets sent over said alternative path to indicate that the main path is down.

22. The method according to claim 21, wherein said step of marking comprises setting an Other Path Down (OPD) flag in Hello packets sent over said alternative path.

23. A network device for providing end-to-end connection protection for dual homed devices in a network having a main path and an alternative path for a specific connection, comprising:
a plurality of network ports for interfacing said network device to one or more network links;
a plurality of edge ports for interfacing said network device to one or more dual homed devices, each dual homed device connected to two network devices via two uplinks, functioning as a main uplink and an alternative uplink with respect to the specific connection;
a network processor;
software means adapted to be executed by said network processor and operative to:
provision a main path starting at a first network device connected to said dual homed device via said main uplink;
provision an alternative path starting at a second network device connected to said dual homed device via said alternative uplink;
provision a Virtual Local Area Network (VLAN) for a connection at said dual homed device;
send and receive Operation, Administration & Maintenance (OAM) packets periodically over said main path by said first network device to verify connectivity to a remote end of said connection;
if connectivity fails, send ingress packets towards said alternative path and set an Other Path Down (OPD) flag in said OAM packets to inform said remote end that said main path is down and to switch traffic to said alternative path;

if connectivity fails, send egress packets received over said main path, tagged with said alternative path, along said alternative path.

24. The network device according to claim 23, wherein said network device comprises an edge switch.

25. The network device according to claim 23, wherein the VLAN ID number of a main VLAN and an alternative VLAN differ in one bit.

26. The network device according to claim 23, wherein the VLAN ID number of a main VLAN and an alternative VLAN differ in the least significant bit only.

27. The network device according to claim 23, wherein said network processor is adapted to be implemented in one or more Application Specific Integrated Circuits (ASICs).

28. The network device according to claim 23, wherein said network processor is implemented in one or more Field Programmable Gate Array (FPGA) integrated circuits.

29. A method of providing dual homed device protection in a network said method comprising the steps of:
provisioning a main-path starting at a first network device connected to said dual homed device via a first uplink;
provisioning an alternative-path starting at a second network device connected to said dual homed device via a second uplink;
provisioning a Virtual Local Area Network (VLAN) for a connection at said dual homed device said first network device and said second network device part of a VLAN stack;
in the event of a failure along said main-path:
returning egress packets received over said main path at the point of failure tagged with said alternative-path and forwarding said tagged egress packets over a protection path to arrive at said dual-homed device via said second uplink;
tagging ingress packets sent from said dual homed device at the point of failure with said alternative-path and forwarding said ingress packets over said alternative path towards a destination;
in the event of a failure in said main-uplink:
returning egress packets received from a core switch back tagged with said alternative-path and forwarding said tagged egress packets over said protection path to arrive at said dual-homed device via said second uplink; and
sending ingress packets over said second uplink to said second network device for tagging with said alternative-path and for forwarding over said alternative path towards said destination.

30. The method according to claim 29, wherein said dual homed device comprises an access device or an aggregation device.

31. The method according to claim 29, wherein said dual homed device comprises a customer edge device.

32. The method according to claim 29, wherein said first network device and said second network device comprise edge switches.

33. The method according to claim 29, wherein said protection path comprises a protection tunnel in a core portion of said network, packets emerging from said protection tunnel continue along said alternative path at the opposite end of a VLAN stack to arrive at said dual homed device via said second uplink.

34. The method according to claim 29, wherein said step of returning ingress packets further comprises the step of marking Operation, Administration & Maintenance (OAM) packets sent over said alternative path with an indication that said main path is down.

35. The method according to claim 34, wherein said step of marking OAM packets comprises setting an Other Path Down (OPD) flag in Hello packets sent over said alternative path.

36. The method according to claim 29, further comprising the steps performed on a remote switch of:
detecting Hello packets with an Other Path Down (OPD) flag set; and
switching traffic to a path merging into said alternative path.

37. The method according to claim 29, wherein said step of tagging with said tag comprises tagging an alternative path by setting the least significant bit (LSB) of the VLAN ID and sending the packet back over the network port from which it was received.

38. The method according to claim 29, wherein the VLAN ID number of a main path and said alternative path differ in one bit.

39. The method according to claim 29, wherein the VLAN ID number of a main path and said alternative path differ in the least significant bit only.

40. The method according to claim 29, wherein the least significant bit (LSB) of a main VLAN ID is zero and the LSB of said alternative path is one.

41. The method according to claim 29, further comprising the step of sending packets of said alternative path to an edge port in a network device terminating said connection when said packets are received over one of said network ports, and sending said alternative path packets along said VLAN stack when received over any other network port.

42. The method according to claim 29, wherein packets arriving from the main path direction tagged with said alternative path continue along said VLAN stack without being forwarded to said dual-homing device.

43. The method according to claim 29, adapted to be implemented using one or more Application Specific Integrated Circuits (ASICs).

44. The method according to claim 29, adapted to be implemented using one or more Field Programmable Gate Array (FPGA) integrated circuits.

45. A system for providing dual homed device protection in a network, comprising:
at least one dual homed device connected to a first network device via a first uplink and to a second network device via a second uplink;
means for provisioning a main path from said first network device and for provisioning an alternative path from said second network device to a remote end, connected to said network;
means for returning egress packets received over said main path at the point of failure, in the event of a failure in said main path, tagged with said alternative-path and forwarding said tagged egress packets over a protection path to arrive at said d dual-homed device via said second uplink;
means for tagging ingress packets sent from said dual homed device at the point of failure with said alternative-path, in the event of a failure in said main path, and forwarding said ingress packets over said alternative path towards a destination;
means for returning egress packets received from a cote switch back tagged with said alternative-path, in the event of a failure in said main uplink, and forwarding said tagged egress packets over said protection path to arrive at said dual-homed device via said second uplink; and means for sending ingress packets over said second uplink, in the event of a failure in said main uplink, to said second network device for tagging with said alternative-path and for forwarding over said alternative path towards said destination.

46. The system according to claim 45, wherein said network comprises a Virtual Local Area Network (VLAN) stack portion comprising a plurality of edge switches.

47. The system according to claim 45, wherein said network comprises a core portion comprising a plurality of core switches.

48. The system according to claim 45, wherein said dual homed device comprises an access/aggregation device.

49. The system according to claim 45, wherein said dual homed device comprises a customer edge device.

50. The system according to claim 45, wherein said first network device and said second network device comprise edge switches.

51. The system according to claim 45, wherein said protection path comprises a protection tunnel in a core portion of said network, wherein packets emerging from said protection tunnel continue along said alternative path at the opposite end of a VLAN stack to arrive at said dual homed device via said second uplink.

52. The system according to claim 45, further comprising means for marking Operation, Administration & Maintenance (OAM) packets sent over said alternative path to indicate that said main path is down.

53. The system according to claim 52, wherein said means for marking OAM packets comprises means for setting an Other Path Down (OPD) flag in Hello packets sent over said alternative path.

54. The system according to claim 45, further comprising:
means for detecting Hello packets with an Other Path Down (OPD) flag set; and
switching traffic to a path merging into said alternative path.

55. The system according to claim 45, wherein said means for tagging with said tag comprises means for setting the least significant bit (LSB) of the VLAN ID and sending the packet back over the network port from which it was received.

56. The system according to claim 45, wherein the VLAN ID number of a main path and said alternative path differ in one bit.

57. The system according to claim 45, wherein the VLAN ID number of a main path and said alternative path differ in the least significant bit only.

58. The system according to claim 45, wherein the least significant bit (LSB) of a main path ID is zero and the LSB of said alternative path is one.

59. The system according to claim 45, further comprising means for sending packets of said alternative path to an edge port in a network device terminating said connection when said packets are received over one of said network ports, and sending said alternative path packets along said stack when received over any other network port.

60. The system according to claim 45, wherein packets arriving from the main path direction tagged with said alternative path continue along said VLAN stack without being forwarded to said dual homed device.

61. The system according to claim 45, adapted to be constructed using one or more Application Specific Integrated Circuits (ASICs).

62. The system according to claim 45, adapted to be constructed using one or more Field Programmable Gate Array (FPGA) integrated circuits.

63. A method of providing connection protection for dual homed devices for use in network devices within a Virtual Local Area Network (VLAN) based stack having a main path and an alternative path, each network device including a plurality of edge ports and a plurality of network ports, said method comprising the steps of:
monitoring the status of each network port and network link connected to said network device;
monitoring the status of each edge port and uplink to a dual-homed device connected to said network device;
provisioning uplink edge ports as main or alternative with respect to a particular connection in accordance with the preference of said dual homed device for sending ingress packets of said particular connection;
detecting a failure of a main edge port or main uplink of a connection and in response thereto;
tagging ingress packets received from said dual homed device with an alternative VLAN and forwarding said tagged packets over an alternative uplink with an alternative VLAN for forwarding over said alternative path;
tagging egress packets received over a network port from said main path with said alternative VLAN, leaving a main-path flag intact and returning said egress packets over the network port they were received on; and
forwarding packets received from said main path over a network port, tagged with said alternative VLAN, along said alternative path without forwarding said packets to said dual homed device via an edge port.

64. The method according to claim 63, wherein said network device comprises an edge switch.

65. The method according to claim 63, wherein said step of tagging with said alternative VLAN comprises setting the least significant bit (LSB) of the VLAN ID.

66. The method according to claim 63, wherein the VLAN ID number of a main VLAN and said alternative VLAN differ in one bit.

67. The method according to claim 63, wherein the VLAN ID number of a main VLAN and said alternative VLAN differ in the least significant bit only.

68. The method according to claim 63, wherein the least significant bit (LSB) of a main VLAN ID is zero and the LSB of said alternative VLAN is one.

69. The method according to claim 63, adapted to be implemented in one or more Application Specific Integrated Circuits (ASICs).

70. The method according to claim 63, adapted to be implemented in one or more Field Programmable Gate Array (FPGA) integrated circuits.

71. A packet processor apparatus for use in a network device for providing connection protection for dual homed devices in a network having a main path and an alternative path, each network device including a plurality of edge ports and a plurality of network ports, comprising:
means for monitoring the status of each network port and network link connected to said network device;
means for monitoring the status of each edge port and uplink to a dual homed device connected to said network device;
provisioning uplink edge ports as main or alternative with respect to a particular connection in accordance with the preference of said dual homed device for sending ingress packets of said particular connection;
means for detecting a failure of a main edge port or main uplink;
means for tagging ingress packets received from said dual homed device with an alternative VLAN and forwarding said tagged packets over an alternative uplink with a tag for forwarding over said alternative path;

means for tagging egress packets received over a network port from said main path with said alternative VLAN, leaving a main-path flag intact and returning said egress packets over the network port they were received on for forwarding over a protection tunnel; and means for forwarding packets received from said main path over a network port, tagged with said alternative VLAN, along said alternative path without forwarding said packets to said dual homed device via an edge port.

72. The apparatus according to claim 71, wherein said dual homed device comprises an access or an aggregation device.

73. The apparatus according to claim 71, wherein said dual homed device comprises a customer edge device.

74. The apparatus according to claim 71, wherein said network device comprises an edge switch.

75. The apparatus according to claim 71, wherein said protection path comprises a protection tunnel in a core portion of said network, packets emerging from said protection tunnel continue along said alternative path at the opposite end of a VLAN stack to arrive at said dual homed device via said second uplink.

76. The apparatus according to claim 71, further comprising means for sending packets of said alternative path to an edge port in a network device terminating said connection when said packets are received over one of said network ports, and sending said alternative path packets along said stack when received over any other network port.

77. The apparatus according to claim 71, wherein packets arriving from the main path direction tagged with said alternative path continue along said path stack without being forwarded to said dual-homing device.

78. The apparatus according to claim 71, wherein said means for tagging ingress packets and said means for tagging egress packets comprises setting the least significant bit (LSB) of the VLAN ID.

79. The apparatus according to claim 71, wherein the VLAN ID number of a main VLAN and said alternative VLAN differ in one bit.

80. The apparatus according to claim 71, wherein the VLAN ID number of a main VLAN and said alternative VLAN differ in the least significant bit only.

81. The apparatus according to claim 71, wherein the least significant bit (LSB) of a main VLAN ID is zero and the LSB of said alternative VLAN is one.

82. The apparatus according to claim 71, adapted to be implemented in one or more Application Specific Integrated Circuits (ASICs).

83. The apparatus according to claim 71, adapted to be implemented in one or more Field Programmable Gate Array (FPGA) integrated circuits.

84. A network device for providing connection protection for dual homed devices in network having a main path and an alternative path for a specific connection, comprising:

a plurality of network ports for interfacing said network device to one or more network links;

a plurality of edge ports for interfacing said network device to one or more dual homed devices, each dual homed device connected to two network devices via two uplinks, one uplink functioning as a main uplink and a second uplink functioning as an alternative uplink with respect to the specific connection;

a network processor;

software means adapted to be executed by said network processor and operative to:

monitor the status of each network port and network link connected to said network device;

monitor the status of each edge port and uplink connected to said network device;

detect a failure of an edge port or main uplink;

tag ingress packets received from said dual homed device with an alternative VLAN and forward said tagged packets over an alternative uplink with a first tag for forwarding over said alternative path;

tag egress packets received over a network port from said main path destined to a dual homed device with a second tag for forwarding to said alternative path via a protection path, leaving a main-path flag intact and send said egress packets over said protection path; and forward packets received from said main path over a network port, tagged with a third tag for forwarding over said alternative path, without forwarding said packets to said dual homed device via an edge port.

85. The network device according to claim 84, wherein said network device comprises an edge switch.

86. The network device according to claim 84, wherein said software means is adapted to tag egress packets by setting the least significant bit (LSB) of a VLAN ID.

87. The network device according to claim 84, wherein the VLAN ID number of a main VLAN and said alternative VLAN differ in one bit.

88. The network device according to claim 84, wherein the VLAN ID number of a main VLAN and said alternative VLAN differ in the least significant bit only.

89. The network device according to claim 84, wherein the least significant bit (LSB) of a main VLAN ID is zero and the LSB of said alternative VLAN is one.

90. The network device according to claim 84, wherein said network processor is adapted to be implemented in one or more Application Specific Integrated Circuits (ASICs).

91. The network device according to claim 84, wherein said network processor is implemented in one or more Field Programmable Gate Array (FPGA) integrated circuits.

* * * * *